(12) United States Patent
Ohue

(10) Patent No.: US 7,697,154 B2
(45) Date of Patent: Apr. 13, 2010

(54) GENERATING MULTIPLE IMAGE FILES FROM AN ORIGINAL DOCUMENT OR ORIGINAL IMAGE DATA

(75) Inventor: Yuji Ohue, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 1077 days.

(21) Appl. No.: 11/043,989

(22) Filed: Jan. 28, 2005

(65) Prior Publication Data

US 2005/0190394 A1 Sep. 1, 2005

(30) Foreign Application Priority Data

Jan. 28, 2004 (JP) .............................. 2004-019999

(51) Int. Cl.
G06F 3/12 (2006.01)
(52) U.S. Cl. ...................... 358/1.15; 358/403; 358/505; 399/362; 399/368
(58) Field of Classification Search ................ 358/1.15, 358/1.18, 402, 403, 452, 453, 462
See application file for complete search history.

(56) References Cited

U.S. PATENT DOCUMENTS

| 6,188,468 | B1 * | 2/2001 | Miyajima .................... 355/407 |
| 6,192,165 | B1 * | 2/2001 | Irons ........................... 382/306 |
| 6,765,612 | B1 * | 7/2004 | Anderson et al. ......... 348/231.2 |
| 6,985,248 | B2 * | 1/2006 | Parulski et al. ............. 358/1.16 |
| 7,209,246 | B2 * | 4/2007 | Suda et al. .................. 358/1.14 |
| 7,464,110 | B2 * | 12/2008 | Pyhalammi et al. ....... 707/104.1 |
| 2002/0111960 | A1 * | 8/2002 | Irons et al. ................... 707/204 |
| 2002/0191220 | A1 * | 12/2002 | Czyszczewski et al. ..... 358/1.18 |
| 2003/0053145 | A1 * | 3/2003 | Nakane ....................... 358/452 |
| 2003/0142953 | A1 * | 7/2003 | Terada et al. .................. 386/46 |
| 2003/0234956 | A1 * | 12/2003 | Salgado et al. ............. 358/1.15 |
| 2005/0128527 | A1 * | 6/2005 | Brawn et al. ................ 358/401 |
| 2005/0185225 | A1 * | 8/2005 | Brawn et al. ................ 358/401 |

FOREIGN PATENT DOCUMENTS

| JP | 10-063868 | 3/1998 |
| JP | 2003-018396 | 1/2003 |
| JP | 2004-200779 | 7/2004 |

OTHER PUBLICATIONS

Skiljan, Irfan; IrfanView v3.85 User Guide, 2003, v3.85, pertinent pages attached.*

* cited by examiner

Primary Examiner—Mark K Zimmerman
Assistant Examiner—Javier J Ramos
(74) Attorney, Agent, or Firm—Oblon, Spivak, McClelland, Maier & Neustadt, L.L.P.

(57) ABSTRACT

A disclosed image file generating apparatus includes an original document reader, a dividing preferences input, a name preferences input, and an image file generator. The original document reader converts an original document to original image data. The dividing preferences input inputs dividing preferences information, including divide number information specifying a number of originals to be included in each of a predetermined number of image files. The name preference input inputs name preferences information, including file name information specifying a file name to be assigned to each of the image files and file initial number information specifying an initial sequential number to be assigned to each of the image files. The image file generator generates the image files corresponding to the original image data according to the dividing preferences and the name preferences.

4 Claims, 22 Drawing Sheets

GENERATING MULTIPLE IMAGE FILES FROM AN ORIGINAL DOCUMENT OR ORIGINAL IMAGE DATA

CROSS-REFERENCE TO RELATED APPLICATIONS

This patent specification is based on Japanese patent application No. JPAP 2004-019999, filed on Jan. 28, 2004, in the Japanese Patent Office, the entire contents of which are incorporated by reference herein.

BACKGROUND OF THE INVENTION

1. Field of the Invention

The present invention relates to generating a predetermined number of image files from an original document or image data. The present invention further relates to an apparatus, system, method, computer product and medium, capable of converting an original document to image data and generating a predetermined number of image files from the image data.

2. Discussion of the Background

Today's image forming apparatuses are often capable of reading an original document, having a plurality of pages, as a single image file or a plurality of image files. When reading the original document as a plurality of image files, a user manually divides the original document into a predetermined number of document, sets, and feeds the original document, one set by one set, to generate an image file for each document set. The background image forming apparatus automatically assigns a file name or a sequential number to the generated image file. When a plurality of document sets are scanned sequentially in a single job, the background image forming apparatus automatically stores the document sets in a same folder.

SUMMARY OF THE INVENTION

It is to be understood that both the foregoing general description of the invention and the following detailed description of the invention are exemplary, but are not restrictive of the invention. Exemplary embodiments of the present invention provide an apparatus, system, method, and computer program product, each capable of generating a selected number of image files from an original document or original image data.

For example, in one exemplary embodiment, an image file generating apparatus includes: an original document reader configured to convert an original document to original image data; a dividing preferences input configured to input dividing preferences information, including divide number information specifying a number of originals to be included in a predetermined number of the image files; a name preferences input configured to input name preferences information, including file name information specifying a file name to be assigned to each of the image files and file initial number information specifying an initial sequential number to be assigned to each of the image files; and an image file generator configured to generate the image files corresponding to the original image data according to the dividing preferences and the name preferences.

In the above exemplary embodiment, the automated generation of image files can increase work productivity and efficiency by preventing the duplication of image file names; prevent overwriting of older image files; and increase the ease of finding a particular image file; since all image files are not necessarily stored to a same folder.

BRIEF DESCRIPTION OF THE DRAWINGS

A more complete appreciation of the disclosure will be readily obtained as the same becomes better understood by reference to the following detailed description when considered in connection with the accompanying drawings, wherein.

DETAILED DESCRIPTION OF EXEMPLARY EMBODIMENTS

Figure 1:
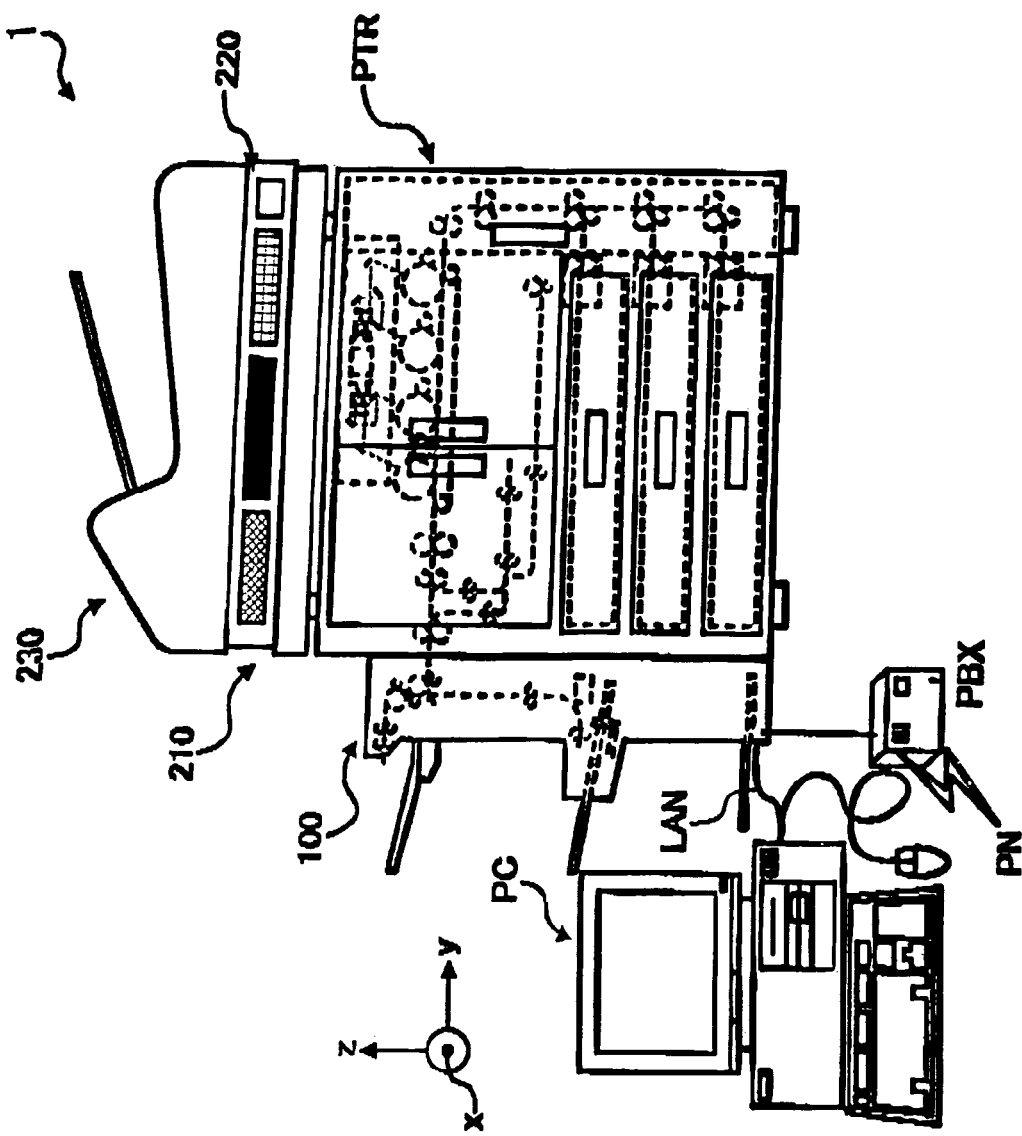
FIG. 1 is a schematic view illustrating an image forming apparatus according to an embodiment of the present invention.

In describing exemplary embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Further, the singular forms "a," "an," and "the," in this patent specification or the appended claims may include plural referents unless expressly and unequivocally limited to one referent. Referring now to the drawings, wherein like reference numerals designate identical or corresponding parts throughout the several views, particularly to FIG. 1, a description is made of an image forming apparatus 1 according to an exemplary embodiment of the present invention.

The image forming apparatus 1 includes an image forming apparatus, capable of generating a plurality of image files from an original document scanned or original image data. For example, the image forming apparatus 1 may be implemented as a multifunctional digital copier, providing functions including scanning, copying, printing, faxing and sending an image file via a network. The network in this exemplary case includes any kind of network or communication line, including an LAN, the Internet, and a public switched telephone network, for example.

As shown in FIG. 1, the image forming apparatus 1 includes a finisher 100, an operational panel 220, a scanner 210, an ADF (automatic document feeder) 230, and a printer PTR. Further, the image forming apparatus 1 may be connected to a personal computer PC through an LAN (local area network), or to the Internet to communicate with other apparatus. Furthermore, the image forming apparatus 1 may be connected to a communication line PN via a private branch exchange (PBX) for facsimile transmission or reception.

Figure 2:
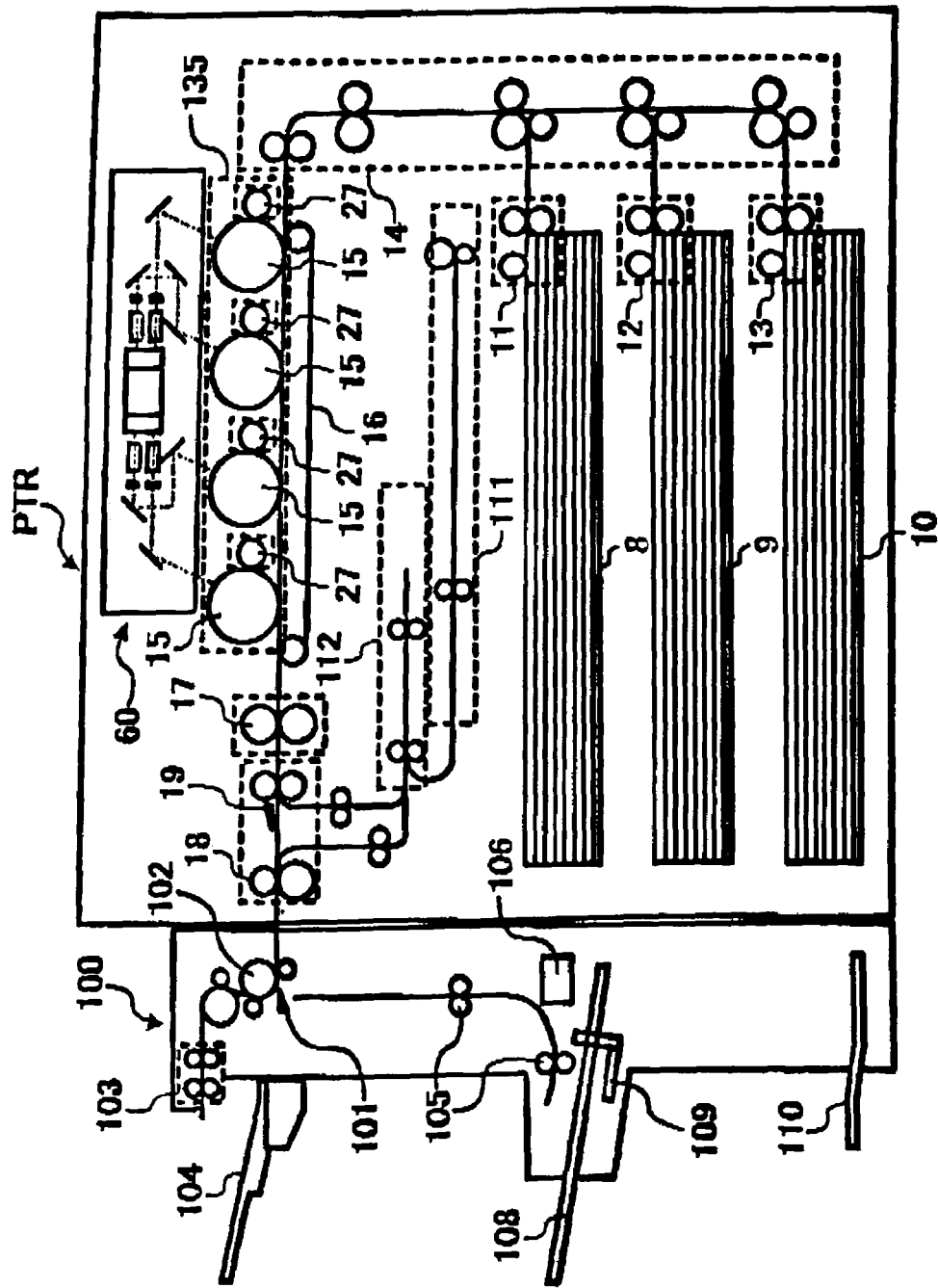
FIG. 2 is a cross sectional view illustrating hardware structures of a printer and a finisher, shown in FIG. 1.

FIG. 2 illustrates an exemplary hardware structure of the printer PTR. As shown in FIG. 2, the printer PTR includes a writing unit 60, an image forming unit 135 provided with at least four photoconductors 15, a transfer belt 16, a fixing device 17, a discharging device 18, and a vertical transfer device 14. The printer PTR further includes a first tray 8, a second tray 9, a third tray 10, a first feeding device 11, a second feeding device 12, and a third feeding device 13. The printer PTR additionally includes a first path selector 19, a duplex feeding device 111, and a reversing device 112.

The writing unit 60 exposes a laser beam onto each of the photoconductors 15 to form a latent image thereon, according to image data received from the scanner 210 or the PC of FIG. 1.

At the same time, one of the feeding devices 11, 12, and 13 drives a recording sheet out from the corresponding one of the trays 8, 9, and 10, to the vertical transfer device 14. The vertical transfer device 14 transfers the recording sheet to the image forming unit 135.

The image forming section 135 includes four image forming devices arranged side by side along the transfer belt 16. Each of the four image forming devices is provided with the photoconductor 15, a developer 27, a charger (not shown), and a cleaner (not shown). Using these four image forming devices, the image forming section 135 sequentially forms toner images of black, cyan, magenta, and yellow on the recording sheet, carried by the transfer belt 16, to form a full color toner image.

The transfer belt 16 carries the recording sheet having the toner image to the fixing device 17. The fixing device 17 fixes the toner image onto the recording sheet.

The recording sheet is then transferred to the discharging device 18, and further to the finisher 100.

Alternatively, the recording sheet may be transferred downward to the reversing device 112, if the first path selector 19 is positioned downward. After being turned over by the reversing device 112, the recording sheet is transferred to the duplex feeding device 111. The duplex feeding device 111 feeds the recording sheet to the vertical transfer device 14, which transfers the recording sheet to the image forming unit 135. The image forming unit 135 forms a full color toner image on the other side of the recording sheet. The recording sheet, having the toner images on both sides, is then driven out from the printer PTR to the finisher 100.

The photoconductors 15, the developers 27, the transfer belt 16, the fixing device 17, and the discharging device 18 are driven, respectively, by a main motor (not shown) incorporated in the printer PTR. The driving force of the main motor is further transmitted via a feeding clutch to the feeding devices 11, 12 and 13, and via an intermediate clutch to the vertical transfer device 14.

FIG. 2 additionally illustrates an exemplary hardware structure of the finisher 100. As shown in FIG. 2, the finisher 100 includes a first transfer device 103, a first discharging tray 104, a second path selector 101, a second transfer device 102, a third transfer device 105, a stapler 106, a staple tray 108, a jogger fence 109, and a second discharging tray 110.

The recording sheet being discharged from the printer PTR may be transferred upward to the first transfer device 103 through the second transfer deice 102, or downward to the third transfer device 105, by changing the position of the second path selector 101.

For example, the second path selector 101 may be positioned upward to transfer the recording sheet through the first transfer roller 103 onto the first discharging tray 104. To sort the recording sheets, the first discharging tray 104 may be shifted in a predetermined amount in the direction perpendicular to the sheet surface, according to a sorting signal received from the operational panel 220 or the PC of FIG. 1, for example.

In another example, the second path selector 101 may be positioned downward to transfer the recording sheet through the third transfer device 105 onto the staple tray 108. The recording sheets placed on the staple tray 108 are stapled together by the stapler 106, after being aligned in the sheet width direction by the jogger fence 109. The stapled sheets are then stacked onto the second discharging tray 110.

Figure 3:
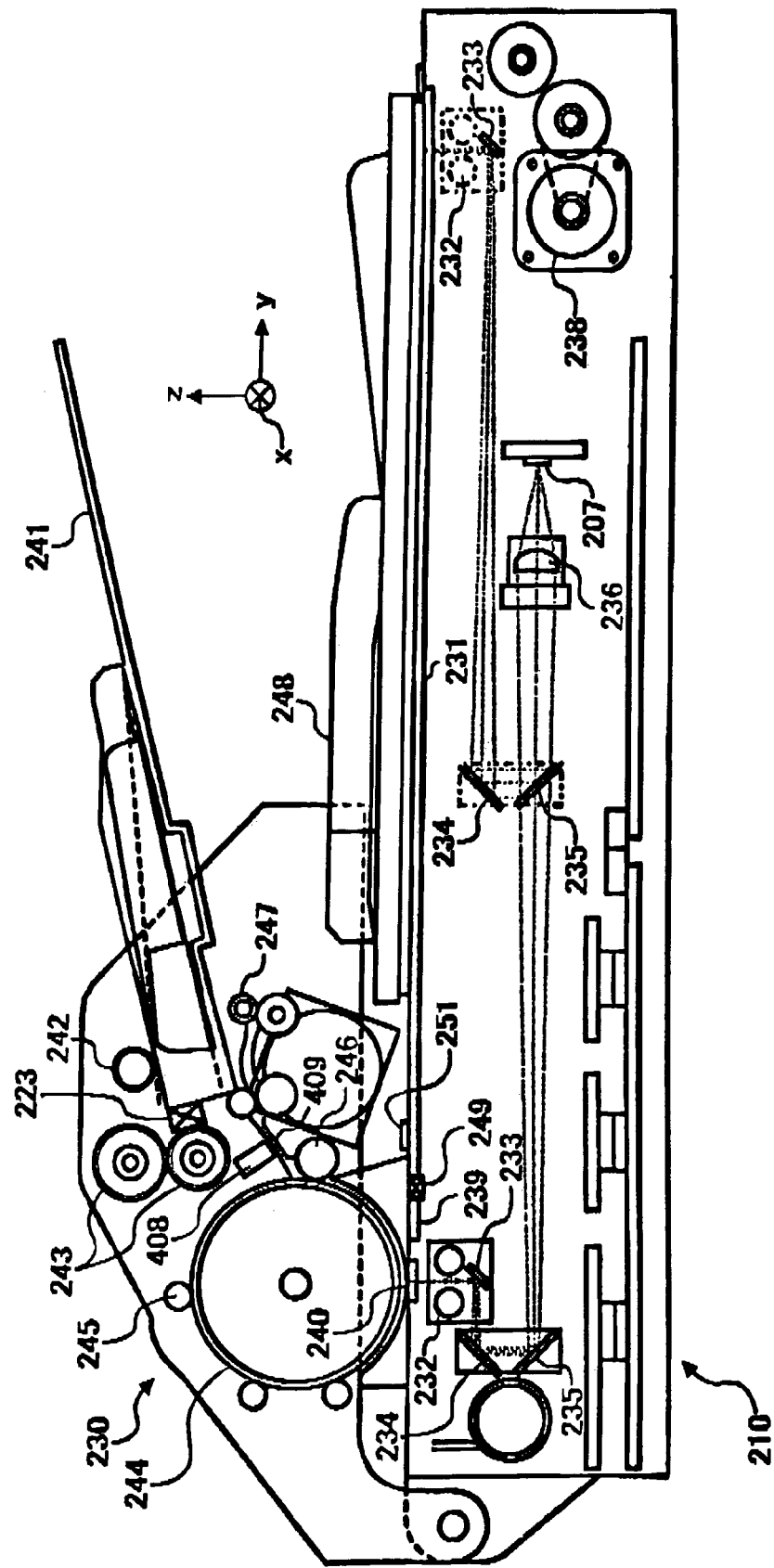
FIG. 3 is a cross sectional view illustrating hardware structures of a scanner and an auto document feeder, shown in FIG. 1.

FIG. 3 illustrates exemplary hardware structures of the ADF 230 and the scanner 210, respectively.

The ADF 230 automatically feeds an original document placed on a document tray 241. In addition to the document tray 241, the ADF 230 includes a pickup roller 242, a registration roller 243, a conveying drum 244, a pressure roller 245, a first transfer roller 246, a second transfer roller 247, and a discharging tray 248.

The pickup roller 242 and the registration roller 243 feed the original document, one page by one page, to a nip formed between the conveying drum 244 and the pressure roller 245. The original document is carried by the conveying drum 244 to the first transfer roller 246. The original document is further carried by the first transfer roller 246 and the second transfer roller 247 onto the discharging tray 248.

Figure 4:
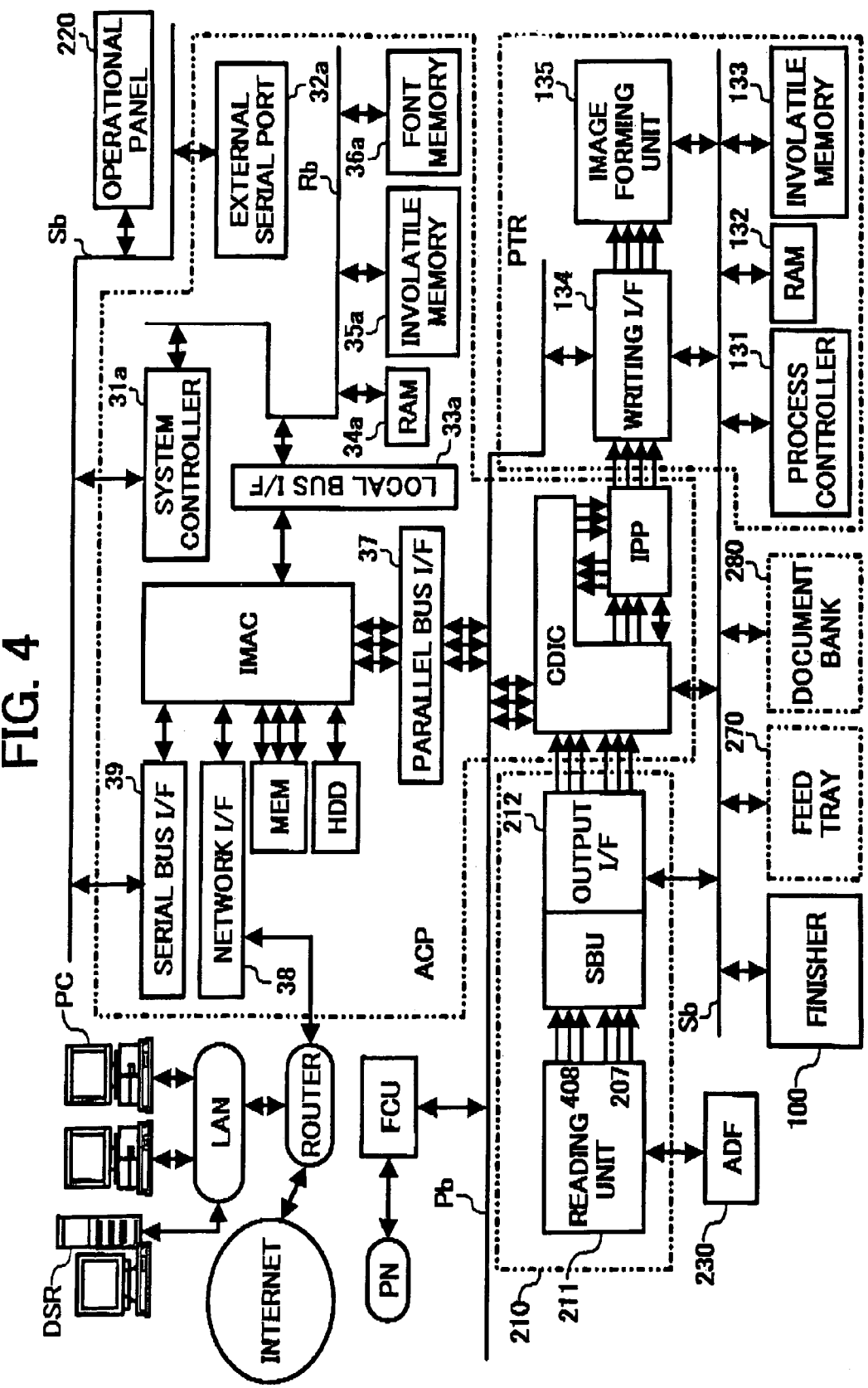
FIG. 4 is a schematic block diagram illustrating a functional structure of the image forming apparatus shown in FIG. 1.

The scanner 210 scans an original document placed on an exposure glass 231 or fed by the ADF 230 by using a reading unit 211 (FIG. 4), and further generates image data corresponding to the original document using a sensor board unit SBU (FIG. 4).

As shown in FIG. 3, the reading unit 211 includes a lamp 232, a first mirror 233, a second mirror 234, a third mirror 235, a lens 236, a reading glass 240, a photographing device 408 and a white board 409. The lamp 232 and the first mirror 233 are mounted on a first carriage (not shown), capable of moving at a constant speed in the direction Y. The second mirror 234 and the third mirror 235 are mounted on a second carriage (not shown), capable of moving at a speed lower than, e.g., half of, the speed of the first carriage. The first carriage and the second carriage are respectively moved by a motor 238.

The SBU includes a CCD (charged coupled device) 207, a reference white board 239, a reference sensor 249, and an A/D (analog to digital) converter (not shown). In this exemplary case, the photographing device 408 also functions as the SBU.

In one example, when an original document is placed on the exposure glass 231, the lamp 232 exposes a light onto the original document. The resultant reflected light is directed by the first mirror 233 toward the second mirror 234 in the direction Y. The reflected light is directed by the second mirror 234 toward the third mirror 235, and further toward the lens 236. The lens 236 focuses the reflected light onto the CCD 207. The CCD 207 converts the reflected light to an electrical signal, such as RGB (red, green, and blue) signals.

In another example, when the original document is fed by the ADF 230, one side of the original document is scanned at the reading glass 240, while the other side of the document is scanned at a nip formed between the photographing device 408 and the white board 409.

When the original document passes through the reading glass 240, the lamp 232 of the scanner 210 exposes a light to one side, facing downward, of the document. The resultant reflected light is directed by the first to third mirrors 233 to 235 toward the CCD 207, as described above. The CCD 207 converts the reflected light to an electric signal, such as RGB signals.

When the original document passes through the nip formed between the photographing device 408 and the white board 409, the photographing device 408 exposes a light onto the other side of the original document, receives the resultant reflected light, and converts the reflected light to an electric signal, such as RGB signals.

The electric signal, which is analog, is converted to a digital signal by the A/D converter. Using the reference white board 239 and the reference sensor 249, the digital signal may be adjusted to reduce shading, i.e., unevenness in light intensity. The corrected digital signal may be provided to the printer PTR or the PC, as image data.

The operational panel 220 allows a user to input instructions to the image forming apparatus 1. For example, the user may input an instruction for copying, faxing, scanning, printing, or sending an image file via the network. Once the instruction is input, the image forming apparatus 1 starts operating according to the instruction.

Instead of using the operational panel 220, the user may input instructions through the PC or any other processor connected to the image forming apparatus via the network.

Referring now to FIG. 4, an exemplary functional structure of the image forming apparatus 1 is explained.

As described referring to FIG. 1, the image forming apparatus 1 includes the scanner 210, the printer PTR, the operational panel 220, the ADF 230, and the finisher 100.

The scanner 210 includes the reading unit 211, the sensor board unit SBU, and an output I/F (interface) 212. The printer PTR includes a writing I/F 134 for controlling the laser beam of the writing unit 60 of FIG. 2, the image forming unit 135, a process controller 131, a RAM (random access memory) 132, and an involatile memory 133.

The image forming apparatus 1 additionally includes an image processing system ACP, capable of providing an image processing function. As shown in FIG. 4, the ACP includes a system controller 31a, an external serial port 32a, a local bus I/F (interface) 33a, a RAM (read only memory) 34a, an involatile memory 35a, a font memory 36a, a parallel bus I/F 37, a network I/F 38, a serial bus I/F 39, an image memory access control IMAC, an image memory module MEM, a hard disk drive HDD, an image data interface control CDIC, and an image processing processor IPP.

The ACP is connected to the scanner 210 via the CDIC, to the printer PTR via the IPP, and to the operational panel 220 via the system controller 31a. Furthermore, the ACP is connected to the finisher 100 via a serial bus Sb, and to the ADF 230 via the scanner 210. Although not shown in FIG. 1, the ACP may be connected, as shown in FIG. 4, to a feed tray 270, capable of storing a large quantity of recording sheets, or to a document bank 280, capable of storing a large quantity of documents.

The system controller 31a is capable of controlling an entire operation of the ACP, or any other devices or units connected to the ACP. For example, the system controller 31a may generate a plurality of image files based on image data sent from the scanner 210, using the IMAC.

The local bus I/F 33a connects the IMAC to other devices or components of the ACP through a local bus Rb. As shown in FIG. 4, the local bus Rb connects the system controller 31a to the RAM 34a, the involatile memory 35a, and the font memory 36a.

The parallel bus I/F 37 connects the ACP to the parallel bus Pb. The parallel bus Pb is used for transferring image data, for example.

The serial bus I/F 39 connects the ACP to a serial bus Sb. As shown in FIG. 4, the serial bus Sb connects the system controller 31a to the operational panel 220 and to the PC through the external serial port 32a.

The network I/F 38 connects the ACP to a network, such as the LAN or the Internet, via a router. As shown in FIG. 4, the ACP can communicate with the PC of FIG. 1 or any other device connected to the LAN, including a delivery server DSR, a printer, a scanner, and a multifunctional product, for example. Further, the ACP can communicate with other devices connected to the Internet. The delivery server DSR of FIG. 4 is capable of sending data received or previously stored to a destination specified or registered by a user through the PC or the operational panel 220.

The HDD is capable of storing a large quantity of data, including image data provided by the scanner 210. The HDD further stores one or more computer programs, including a web server program, an FTP server program, a SMTP server program, a DHCP server program, a mail server program, and an image file generating program, for example.

The RAM 34a functions as a work area of the system controller 31a. The involatile memory 35a stores the image file generating program and one or more other programs to be used by the system controller 31a, loaded from the HDD, when the system controller 31a is activated. The font memory 36a stores font data to be used by the PTR, for example. The MEM stores various data, including image data provided by the scanner 210, for example.

The CDIC controls a flow of image data carried through various interfaces, including the parallel bus I/F 37, the serial bus I/F 39, the local bus I/F 33a, and the network I/F 38. For example, the CDIC may receive image data, generated by the scanner 210, from the SBU through the output I/F 212, and transfer the image data to the IPP, to the parallel bus Pb, or to the serial bus Sb. Further, the CDIC may control mutual communication between the system controller 31a and the process controller 131 of the printer PTR, which are connected via the parallel bus Pb and the serial bus Sb, by data format conversion, for example.

The IMAC performs various operations according to instructions received from the system controller 31a, including controlling access to the MEM or HDD, controlling data input or output to or from the MEM or HDD, compressing or decompressing image data stored in the MEM or HDD, deploying image data to be printed by the PC through character code or bit conversion, controlling transmission of an image file on the network, etc.

In one example, the IMAC receives the image data from the scanner 210 through the CDIC, compresses the image data, and stores the compressed image data in the MEM or HDD for future use. When the image data is to be printed by the PTR, for example, the IMAC decompresses the image data, and outputs it to the CDIC through the parallel bus Pb. Alternatively, when the image data is to be sent through the network, the IMAC outputs the image data, without decompressing it, to the network through the network I/F 38.

In another example, the IMAC allows the operational panel 220 or the PC to communicate with the system controller 31a, to perform various functions of the image forming apparatus 1.

The IPP applies various image processing to the image data received from the CDIC, including scanner gamma correction, noise filtering, and shading correction, for example, to correct signal degradation caused through scanning. The corrected image data is then returned to the CDIC to be stored in the MEM or HDD, for example.

Further, the IPP applies various image quality processing to the image data to be printed by the printer PTR, including printer gamma correction, gradation processing such as dither processing and error diffusion processing, and gradation conversion, for example. The corrected image data is transferred to the writing I/F 134 of the PTR.

Figure 5:
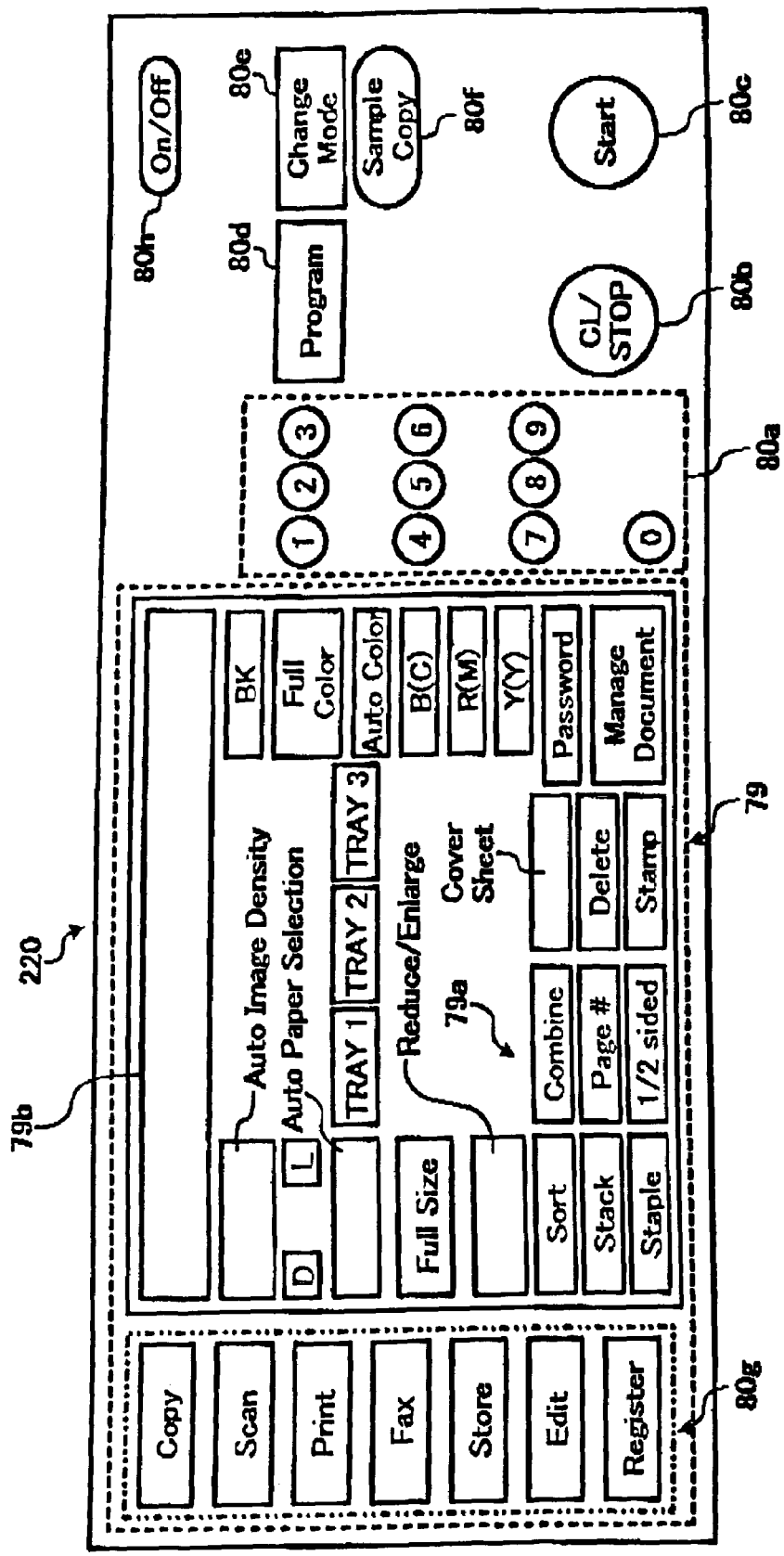
FIG. 5 is a view illustrating the display of an operational panel, shown in FIG. 1, according to an embodiment of the present invention.

FIG. 5 illustrates an exemplary structure of the operational panel 220. The operational panel 220 includes a touch panel 79 having a liquid crystal display, a ten key panel 80a having ten number keys, a "CL/STOP" key 80b, a "Start" key 80c, a "Program" key 80d, a "Change Mode" key 80e, a "Sample Copy" key 80f, and an "On/Off" key 80h. The operational panel 220 may further include a keyboard, displaying alphabets.

The "CL/STOP" key 80b clears previous input or stops a current operation, and returns to default settings. The "Start" key 80c sends previous input to the system controller 31a to start an operation according to the previous input. The "Program" key 80d allows a user to set various default settings, including image density, resolution, recording sheet size, various modes including an energy saver mode, etc. The "Change Mode" key 80e allows a user to switch from one mode to another mode. The "Sample Copy" key 80f allows a user to check copying or printing quality, for example, by copying or printing one page. The "On/Off" key 80h allows a user to turn on or off the image forming apparatus 1.

The touch panel 79 displays various information, which facilitates communication between the image forming apparatus 1 and a user. For example, the touch panel 79 of FIG. 5 includes a status display part 79b, a function display part 79a, and a function selection part 80g. The status display part 79b displays a current status or operation of the image forming apparatus 1, or displays a message to the user. The function selection part 80g allows a user to select one of various functions performed by the image forming apparatus 1, including copying, scanning, printing, faxing, filing, editing, and registering. Further, the function selection part 80g may display other functions, such as a combining function, for example.

When the user selects one of the functions by touching one of the keys displayed in the function selection part 80g, specific function keys or settings related to the selected function are displayed in the function display part 79a. In addition, the status display part 79b displays a current status or message corresponding to the selected function.

FIG. 5 illustrates an exemplary case when the copying function is selected. The status display part 79b displays the message "Ready to Copy". Further, a current copy status of the image forming apparatus 1 is displayed, including the number of printed sets or sheets, for example. The function display part 79a displays various function keys related to the copying function, including keys for setting image density, keys for selecting a recording sheet tray, keys for selecting reduction or enlargement, keys for adjusting colors, etc.

As mentioned above referring to FIG. 1, the image forming apparatus 1 is capable of providing one or more functions, according to instructions input through the operational panel 220 or the PC.

To perform facsimile transmission, the scanner 200 and the ADF 230 obtain image data corresponding to an original document. The IPP applies various image processing to the image data, and sends it to the FCU via the CDIC and the parallel bus Pb. The FCU converts the image data to facsimile data, and sends the facsimile data to the PN.

To perform facsimile reception, the FCU converts line data, received from the PN, to image data, and sends it to the IPP via the CDIC and the parallel bus Pb. The printer PTR forms an image on a recording sheet, using the writing I/F 134 and the image forming unit 135. In this exemplary case, the image data is not subjected to image quality processing performed by the IPP, but is subjected to dot rearrangement or pulse control performed by the writing I/F 134.

To perform a plurality of jobs concurrently, including scanning, copying, faxing, and printing, the system controller 31a and the process controller 131 manage the use of the related devices or interfaces, including the reading unit 211, the image forming unit 135, and the parallel bus Pb. For example, the process controller 131 controls the flow of image data. The system controller 31a controls the entire system and manages activation of each resource or job.

Figure 6:
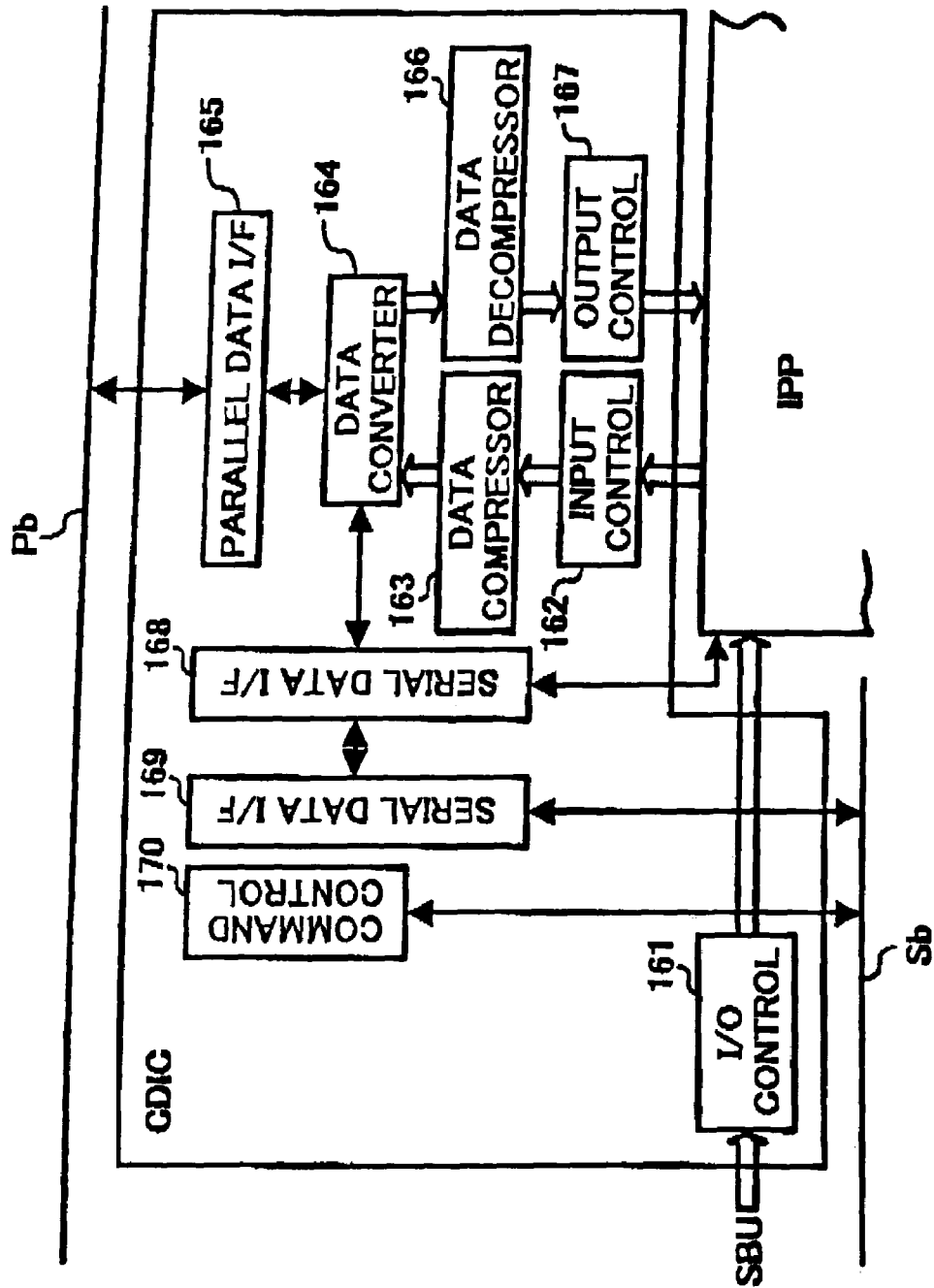
FIG. 6 is a schematic block diagram illustrating a functional structure of an image data interface control (CDIC), shown in FIG. 4.

Referring now to FIG. 6, an exemplary functional structure of the CDIC is explained.

As shown in FIG. 6, the CDIC includes an image data I/O (input/output) control 161, a command control 170, a first serial data I/F 169, a second serial data I/F 168, a parallel data I/F 165, a data converter 164, a data compressor 163, a data decompressor 166, an image data input control 162, and an image data output control 167.

The image data I/O control 161 receives image data from the SBU of the scanner 210. In this case, the image data may be stored in the MEM or HDD, as described referring to FIG. 4. The image data I/O control 161 outputs the image data to the IPP for image processing, through the second serial data I/F 168. The image data input control 162 receives the image data from the IPP through the second serial data I/F 168, and sends it to the data compressor 163. The data compressor 163 compresses the image data, using a primary compression technique, enhancing the bus transfer efficiency. The data converter 163 converts the compressed image data from serial to parallel, and sends the parallel image data to the parallel bus Pb through the parallel data I/F 165.

The data converter 164 obtains parallel image data from the parallel bus Pb through the parallel data I/F 165, and converts it from parallel to serial. The data decompressor 166 decompresses the image data, which is compressed, and sends the decompressed image data to the image data output control 167. The image data output control 167 sends the image data to the IPP through the second serial data I/F 168.

As described above referring to FIG. 4, the CDIC is capable of converting data formats to allow mutual communication between the system controller 31a and the process controller 131. The CDIC receives parallel image data from the system controller 31a through the parallel data I/F 165 and the parallel bus Pb. The CDIC receives serial image data from the process controller 131 through the first serial data I/F 169 and the serial bus Sb. To facilitate communication between the system controller 31 and the process controller 131, the CDIC performs serial/parallel conversion, using the data converter 164.

Figure 7:
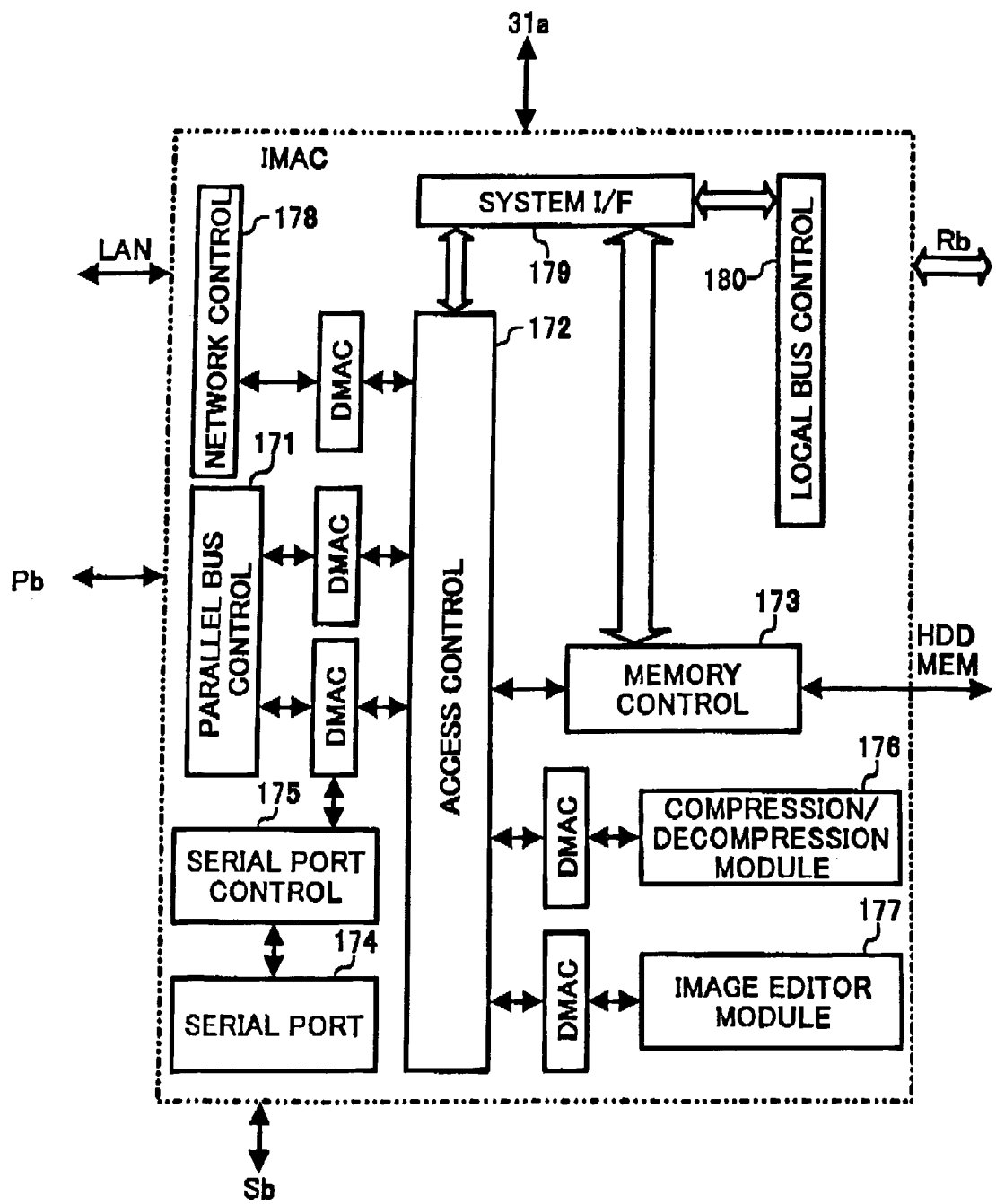
FIG. 7 is a schematic block diagram illustrating a functional structure of an image memory access control (IMAC), shown in FIG. 4.

Referring now to FIG. 7, an exemplary functional structure of the IMAC is explained.

As shown in FIG. 7, the IMAC includes a network control 178, a parallel bus control 171, a serial port control 175, a serial port 174, a system I/F 179, an access control 172, a memory control 173, a compression/decompression module 176, an image editor module 177, and a local bus control 180. The network control 178, the parallel bus control 171, the serial port control 175, the compression/decompression module 176, and the image editor module 177 are respectively connected to the access control 172 through DMACs (direct memory access controls).

The system I/F 179 controls transmission of an instruction or command from the system controller 31a, or transmission of image data within the system.

The parallel bus control 171 controls a flow of image data on the parallel bus Pb. The parallel bus control 171 allows the system controller 31a to control other devices or units through the parallel bus Pb.

The network control 178 controls transmission of data on the network, such as the LAN and the Internet. In one example, the network control 178 controls transfer of files or mails through the network, using corresponding ones of the computer programs stored in the HDD. In another example, the network control 178 prepares data to be sent to the network, or stores received data in a directory. In yet another example, the network control 178 instructs other device to generate data to be sent or create a directory for storing received data, according to an instruction from the operational panel 220 or the PC.

The serial port 174 includes a plurality of ports, with each port being connected to the serial bus Sb. To control each port of the serial port 174, the serial port control 175 includes the corresponding number of port controls. Using the serial port control 175 and the serial port 174, the operational panel 220 can communicate with the system controller 31a.

The local bus control 180 controls the local serial bus Rb, which connects the system controller 31a, the RAM 34a, the involatile memory 35a, and the font memory 36a.

The access control 172 controls access to the MEM or HDD. For example, when a plurality of jobs are performed simultaneously by the image processing apparatus 1, the access control 172 prioritizes the jobs, and controls the use of each device accordingly.

The memory control 173 controls input or output of image data to or from the MEM or HDD.

The compression/decompression module 176 applies a second compression or decompression to image data received from the CDIC through the parallel bus Pb, before storing the image data in the MEM or HDD. Further, the compression/decompression module 176 manages the interface between the MEM or HDD and the DMAC.

The image editor module 177 edits image data stored in the MEM or HDD through the DMAC. For example, the image editor module 177 may rotate orientation of an image or combine different images into one image. The image editor module 177 obtains the secondary compressed image data from the MEM or HDD, and decompresses the image data to the first compressed image data, using the compression/decompression module 176. The image editor module 177 further decompresses the first image data to the image data, using a technique used by the CDIC of FIG. 5. After editing the image data, the image editor module 177 compresses it back to the secondary image data, and stores it in the MEM or HDD.

Figure 8:
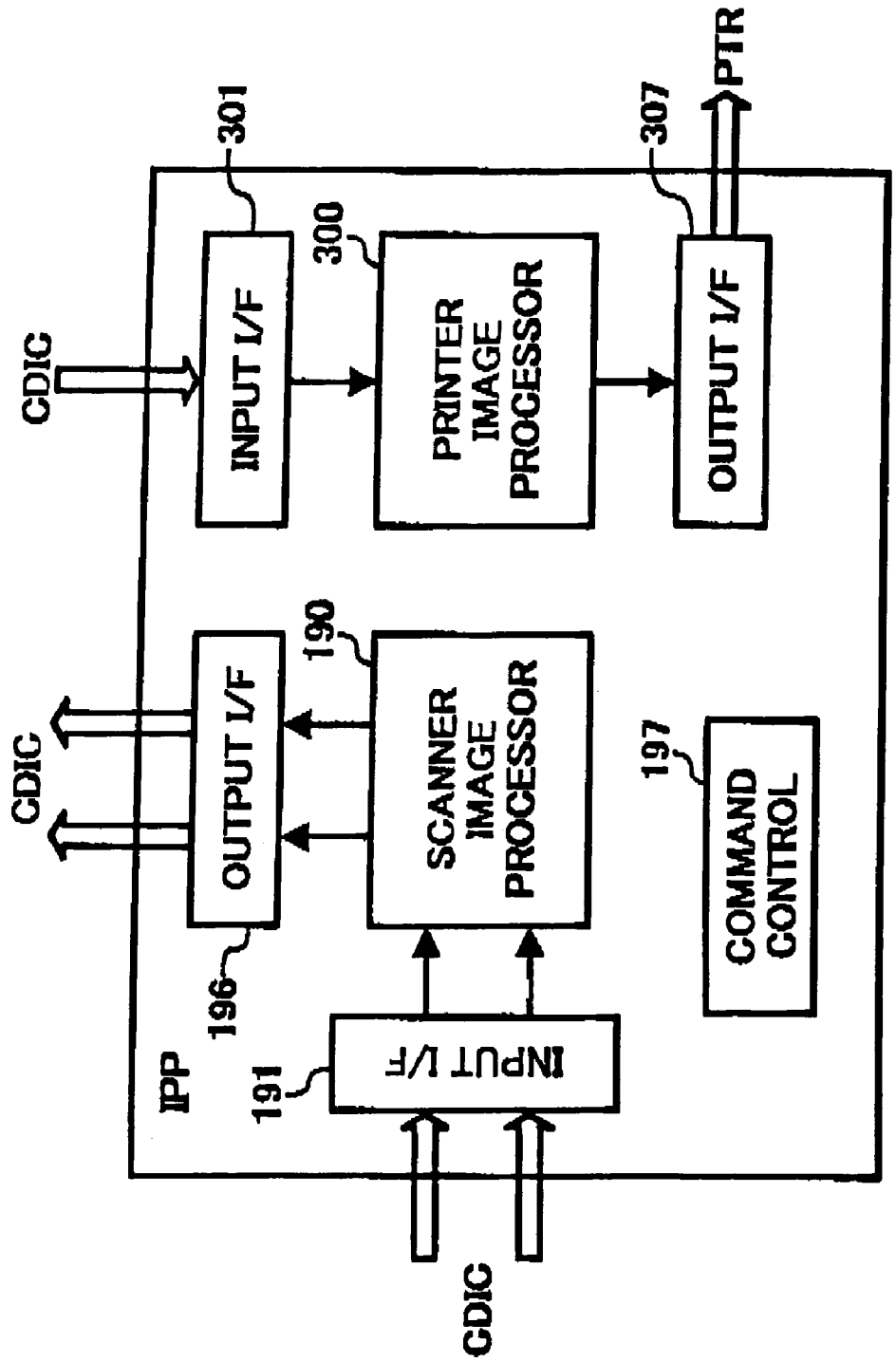
FIG. 8 is a schematic block diagram illustrating a functional structure of an image processing processor (IPP), shown in FIG. 4.

Referring now to FIG. 8, an exemplary functional structure of the IPP is explained.

As shown in FIG. 8, the IPP includes a command control, an input I/F 191, an output I/F 196, a scanner image processor 190, an input I/F 301, an output I/F 307, and a printer image processor 300.

The input I/F 191 receives image data from the CDIC, and sends it to the scanner image processor 190. The scanner image processor 190 applies various image processing to the image data, including shading correction and scanner gamma correction, to correct signal degradation. The corrected image data is then output to the CDIC through the output I/F 196, to be stored in the MEM or HDD, for example. The scanner image processor 190 obtains image data from the CDIC through the input I/F 301. The printer image processor 300 applies various image quality processing to the image data, and sends it to the printer PTR through the output I/F 307 for printing.

Figure 9:
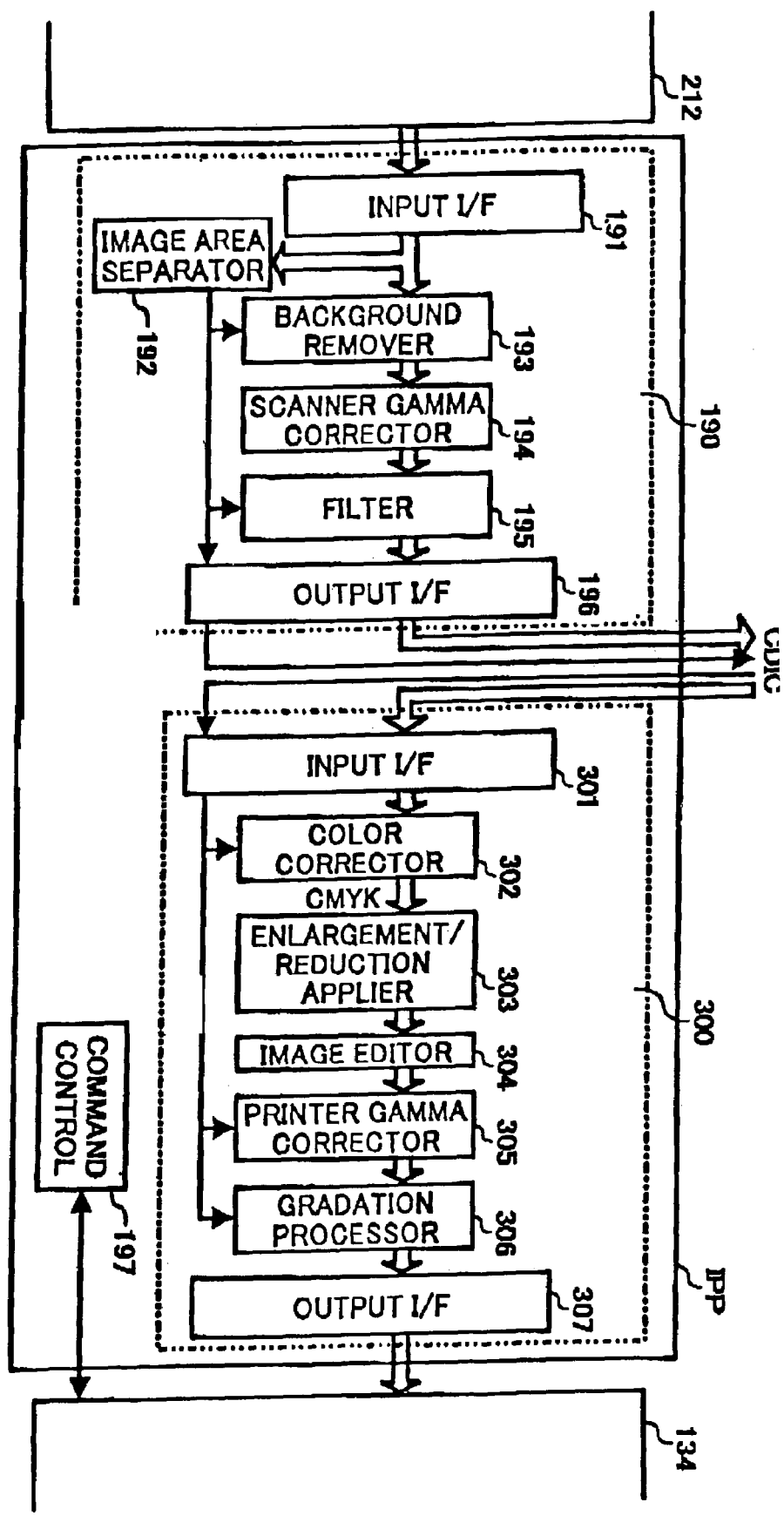
FIG. 9 is a schematic block diagram illustrating various functions performed by the image processing processor (IPP) of FIG. 4.

FIG. 9 illustrates exemplary image processing performed by the scanner image processor 190, and exemplary image quality processing performed by the printer image processor 300.

The scanner image processor 190 includes an image area separator 192, a background remover 193, a scanner gamma corrector 194, and a filter 195.

The image area separator 192 analyzes image data received from the input I/F 191, by determining the type (text image data or picture image data, for example) of the image data. Based on this analysis, the background remover 193, the scanner gamma corrector 194, and the filter 195 apply image processing to the image data. The background remover 193 adjusts the image density of the image data. The scanner gamma corrector 194 converts the image data, which is read in proportion to the reflection coefficient, to the image data in proportional to the density. The filter 195 eliminates noise components of the image data or sharpens characters, for example, to improve the image quality.

The printer image processor 300 includes a color corrector 302, an enlargement/reduction applier 303, an image editor 304, a printer gamma corrector 305, and a gradation processor 306.

The color corrector 302 converts the image data received from the input I/F 301 from RGB to CMYK. The enlargement/reduction applier 303 enlarges or reduces the image data, according to an instruction received from the system controller 31a. The image editor 304 edits the image data, according to an instruction received from the system controller 31a. The printer gamma corrector 305 converts the image data, according to the output characteristics of the printer PTR. The gradation processor 306 performs various gradation processing such as dither processing and error diffusion processing, and gradation conversion, as described above referring to FIG. 4.

Figure 10:
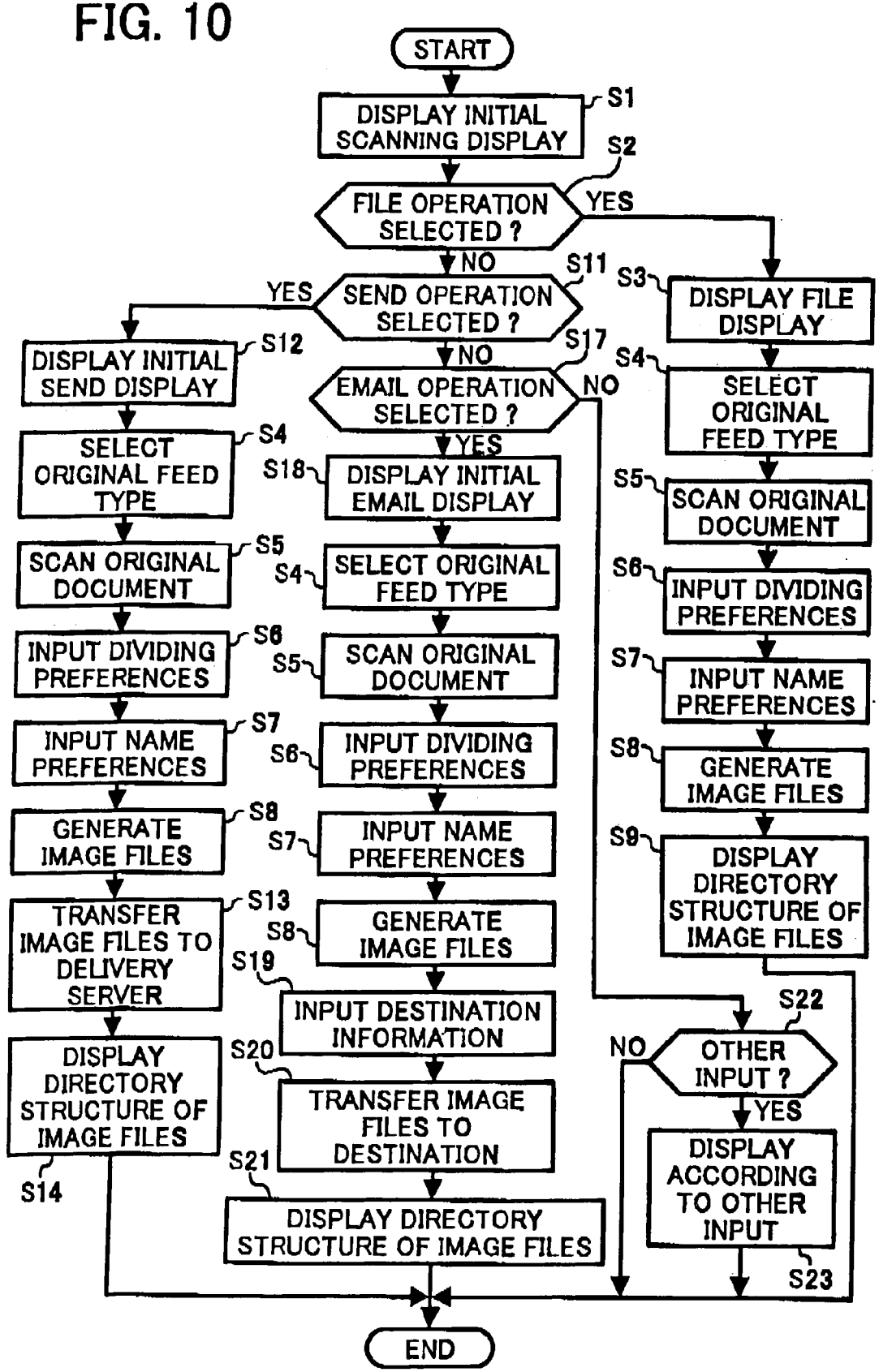
FIG. 10 is a flowchart illustrating exemplary scanning operations, performed by the image forming apparatus of FIG. 1, according to an embodiment of the present invention.

Referring now to FIG. 10, exemplary scanning operations, performed by the image forming apparatus 1, are explained, according to an embodiment of the present invention. The steps shown in FIG. 10 are performed by the system controller 31a, when a user selects the scanning function, by touching the "Scan" key displayed on the operational panel 220 of FIG. 5, for example. The system controller 31a loads the image file generating program and one or more other programs stored in the HDD onto the involatile memory 35 to perform the steps illustrated in FIG. 10.

Figure 11:
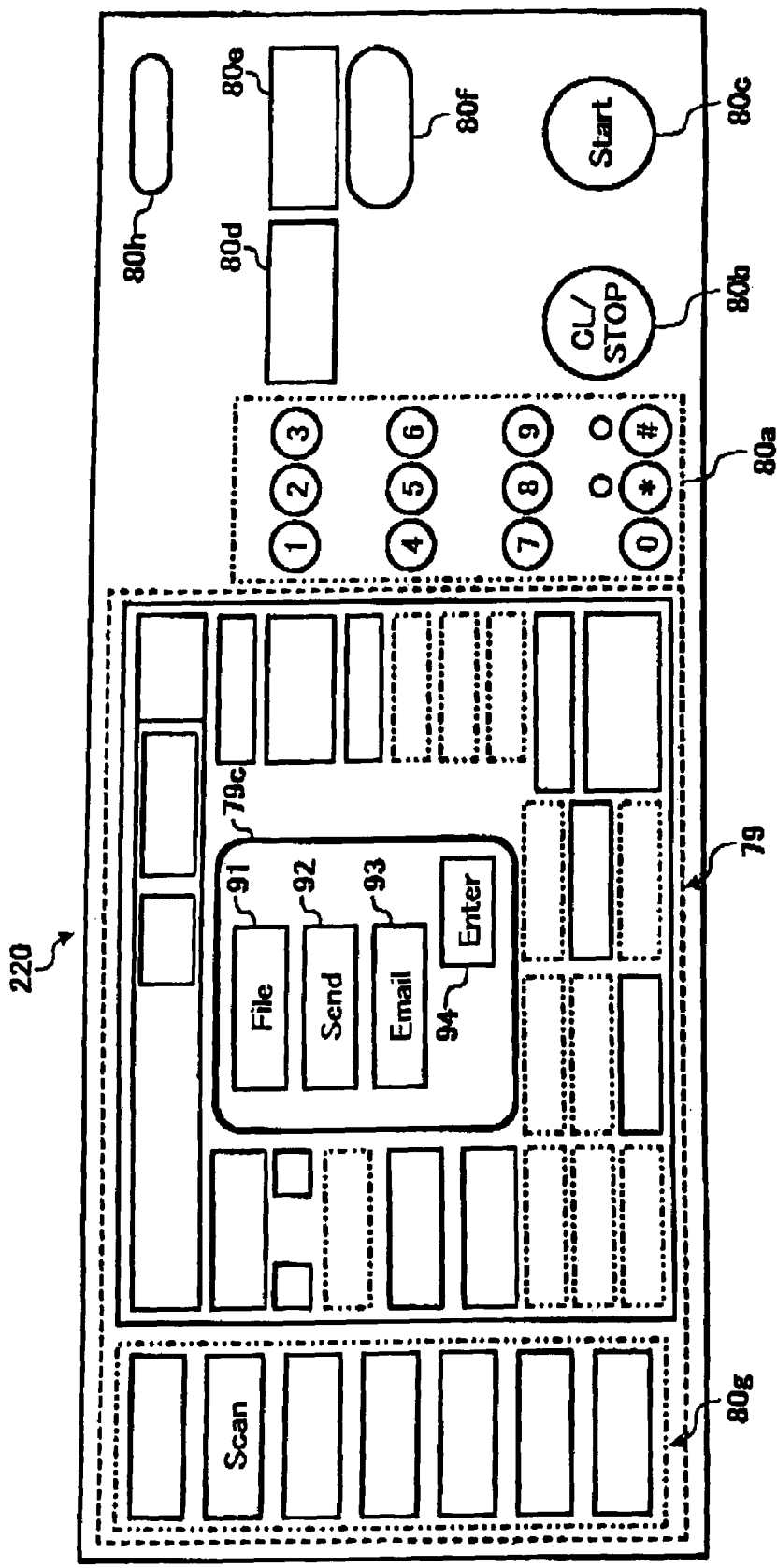
FIG. 11 is a view illustrating an initial scanning display, displayed by the operational panel of FIG. 1, according to an embodiment of the present invention.

Step S1 causes the operational panel 220 to display an initial scanning display, as shown in FIG. 11, for example. The operational panel 220 of FIG. 11 displays a scanning selection part 79c, in addition to the parts displayed on the operational panel 220 of FIG. 5. The scanning selection part 79c includes a "File" key 91, a "Send" key 92, an "Email" key 93, and an "Enter" key 94.

The "File" key 91 is provided for storing an image file in a memory of the image forming apparatus 1, such as the HDD, for future use (the "file operation"). The "Send" key 92 is provided for sending an image file to the delivery server DSR (the "send operation"), and further to a destination specified by a user. The "Email" key 93 is provided for sending an image file to an email destination specified by a user (the "email operation").

Step S2 determines whether the file operation is selected according to information or a command received from the operational panel 220. A user can select the file operation by touching the "Enter" key 94 after touching the "File" key 91. If the file operation is selected, the process moves to Step S3 to perform Steps S3 to S9. Otherwise, the process moves to Step S11.

Figure 12:
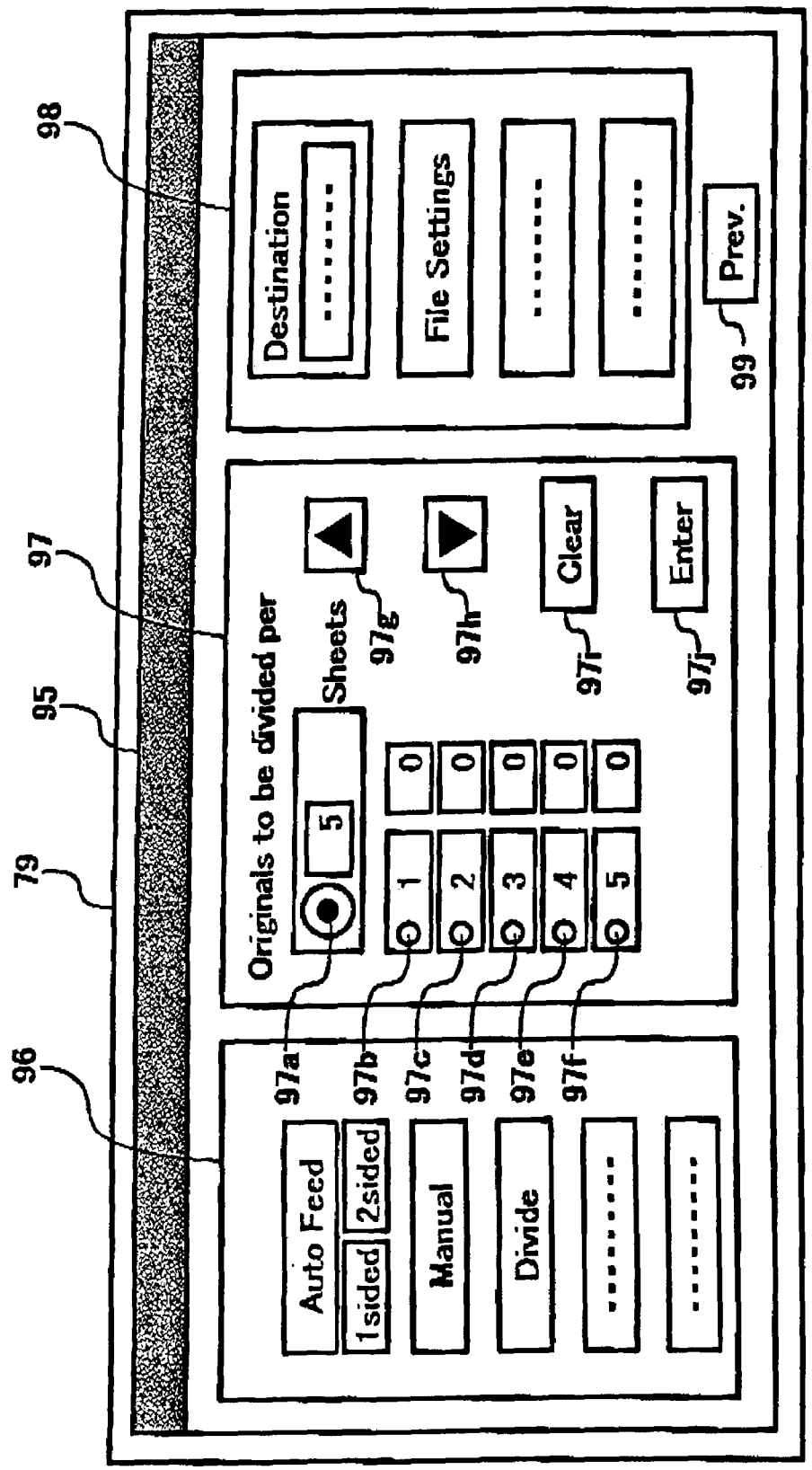
FIG. 12 is a partial view illustrating a display for inputting dividing preferences, displayed by the operational panel of FIG. 1, according to an embodiment of the present invention.

Step S3 causes the operational panel 220 to display an initial file display, which is substantially similar to the initial scanning display of FIG. 11, except that the touch panel 79 displays a display illustrated in FIG. 12, for example. The touch panel 79 of FIG. 12 includes a status bar 95, a feed type selection part 96, a display panel 97, a destination setting part 98, and a "Prev." key 99. The status bar 95 displays a current status of the image forming apparatus 1. In this exemplary case, the status bar 95 displays "File", indicating that the file operation is selected. The feed type selection part 96 is provided for selecting an original feed type. The display panel 97 is provided for displaying various information related to a current operation of the image forming apparatus 1, including current operation status, error messages, and function keys. The destination setting part 98 is provided for setting various destinations, including an email destination and a fax destination, for example. The "Prev." key 99 is provided for allowing the user to view the previous display, such as the initial scanning display shown in FIG. 11.

Step S4 allows the user to select an original feed type. As shown in FIG. 12, the feed type selection part 96 includes an "Auto Feed" key, a "Manual" key, a "1 sided" key, a "2 sided" key, and a "Divide" key. The "Auto Feed" key is provided for feeding an original document through the ADF 230 ("auto feed type"), while the "Manual" key is provided for feeding an original document manually through the exposure glass 231 ("manual feed type"). The user selects either the auto feed type or the manual feed type, by touching either the "Auto Feed" key or the "Manual" key. Further, the user may select whether the original document is one-sided or double-sided, by selecting either the "1 sided" key or the "2 sided" key.

In addition to the keys shown in FIG. 12, the feed type selection part 96 may further include a "Batch" key, a "Mixed Sizes" key, and keys for inputting information regarding the type of an original document (such as whether it is text or image), for example.

Step S5 scans an original document provided by the user by one of the original feed types, using the scanner 210. The scanner 210 scans an original document, page by page, and generates image data corresponding to the scanned original document. The system controller 31a, after receiving the scanned image data, automatically assigns a sequential number to each page of the original document, and stores the image data in the image memory area of the MEM or HDD.

Step S6 allows the user to input dividing preferences. When the user selects the "Divide" key of the feed type selection part 96, the display panel 97 displays an equal divide key 97a, unequal divide keys 97b to 97f, an up key 97g, a down key 97h, a "Clear" key 97i, and an "Enter" key 97j, as shown in FIG. 12. The equal divide key 97a is provided for equally dividing the scanned original document into a predetermined number of image files. The unequal divide keys 97b to 97f are provided for dividing the scanned original document into a predetermined number of image files, with each file having a number of pages specified by the user.

Figure 13:
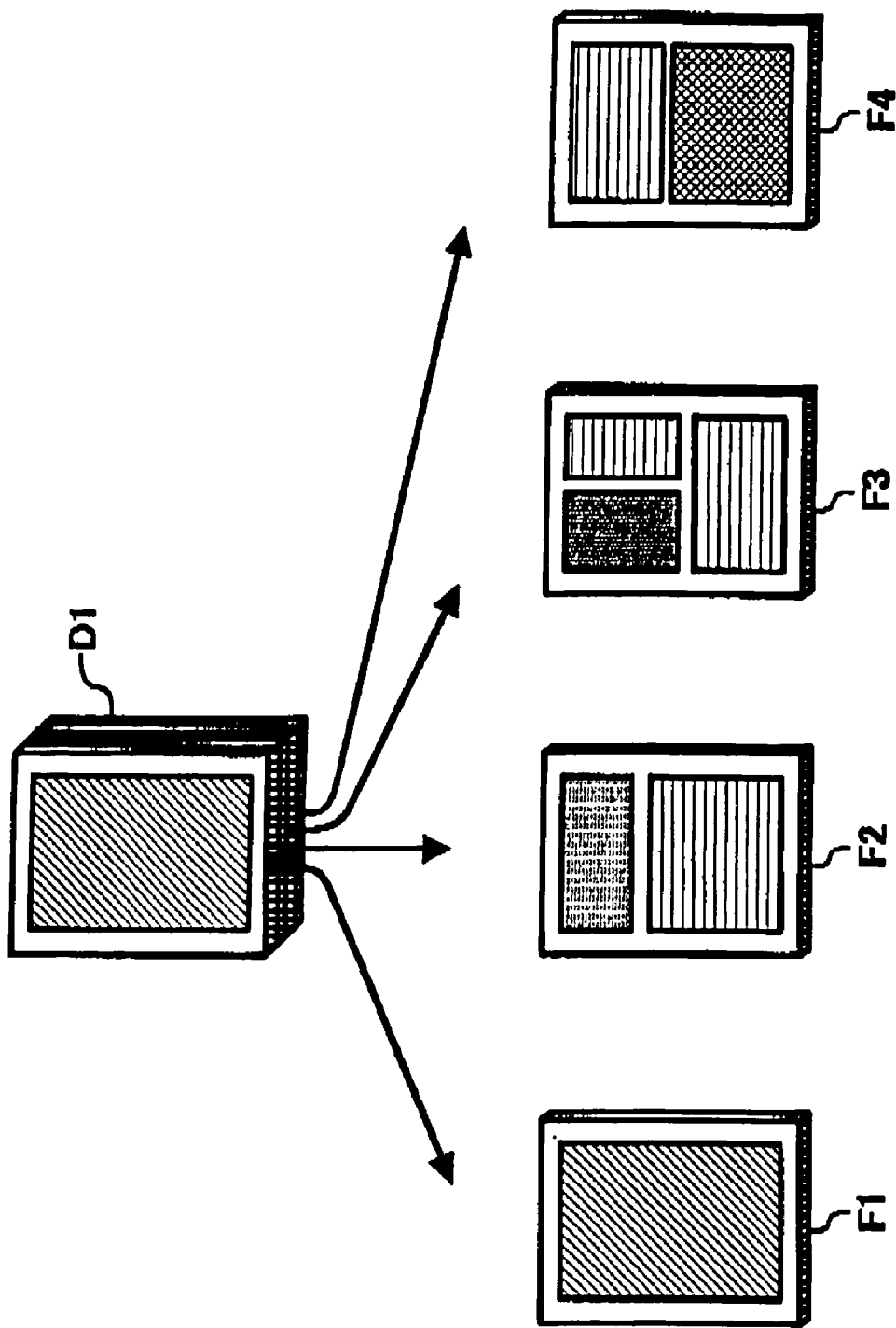
FIG. 13 is a view illustrating dividing of an original document into image files, according to an embodiment of the present invention.

FIG. 13 illustrates an exemplary case of dividing an original document D1 into four image files, including a first file F1, a second file F2, a third file F3, and a fourth file F4. The original document D1 is assumed to include 20 pages.

In one example, if the user prefers to divide the original document D1 evenly, the user touches the equal divide key 97a, which displays a default number of pages to be included in each file. By selecting either the up key 97g or the down key 97h, the user can increase or decrease the default number by one, to finally display the number "5", as shown in FIG. 12. Alternatively, the user may directly input the number "5", by using the ten key panel 80a shown in FIG. 5.

In another example, if the user prefers to divide the original document D1 into the first file F1 having five pages, the second file F2 having seven pages, the third file F3 having three pages, and the fourth file F4 having two pages, the user sets, individually, a number of pages to be included in each of the files F1 to F4. To specify the number for the first file F1, the user selects the key 97b of FIG. 12, and displays the number "5" by selecting either the up key 97g or the down key 97h or directly inputting the number "5". Similarly, the user displays the number "7" on the key 97c, the number "3" on the key 97d, and the number "2" on the key 97e.

When the user touches the "Enter" key 91j, the operational panel 220 sends information regarding the dividing preferences ("dividing information") to the system controller 31a. The system controller 31a stores the dividing information in the MEM, for example.

Figure 14:
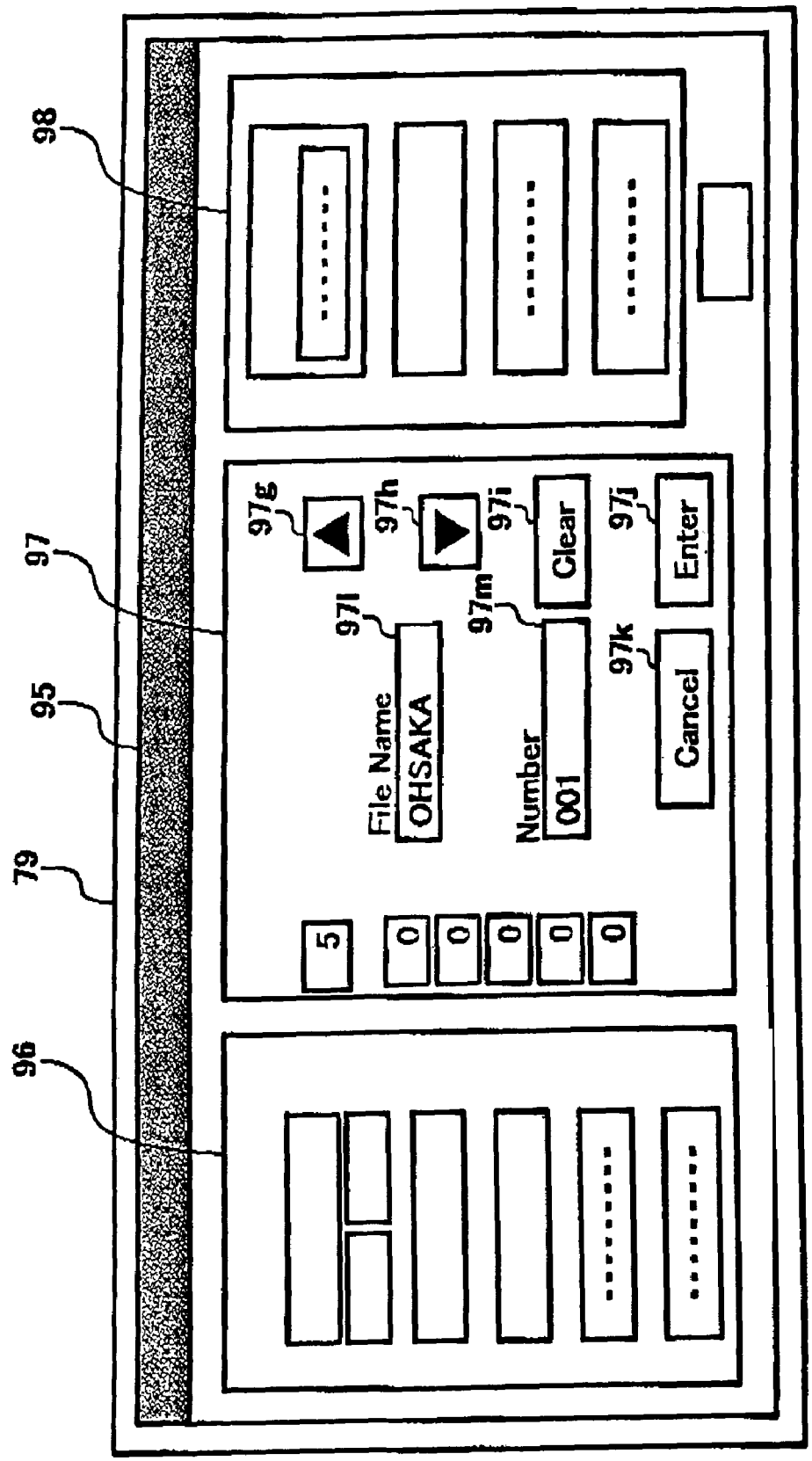
FIG. 14 is a partial view illustrating a display for inputting name preferences, displayed by the operational panel of FIG. 1, according to an embodiment of the present invention.
Figure 15:
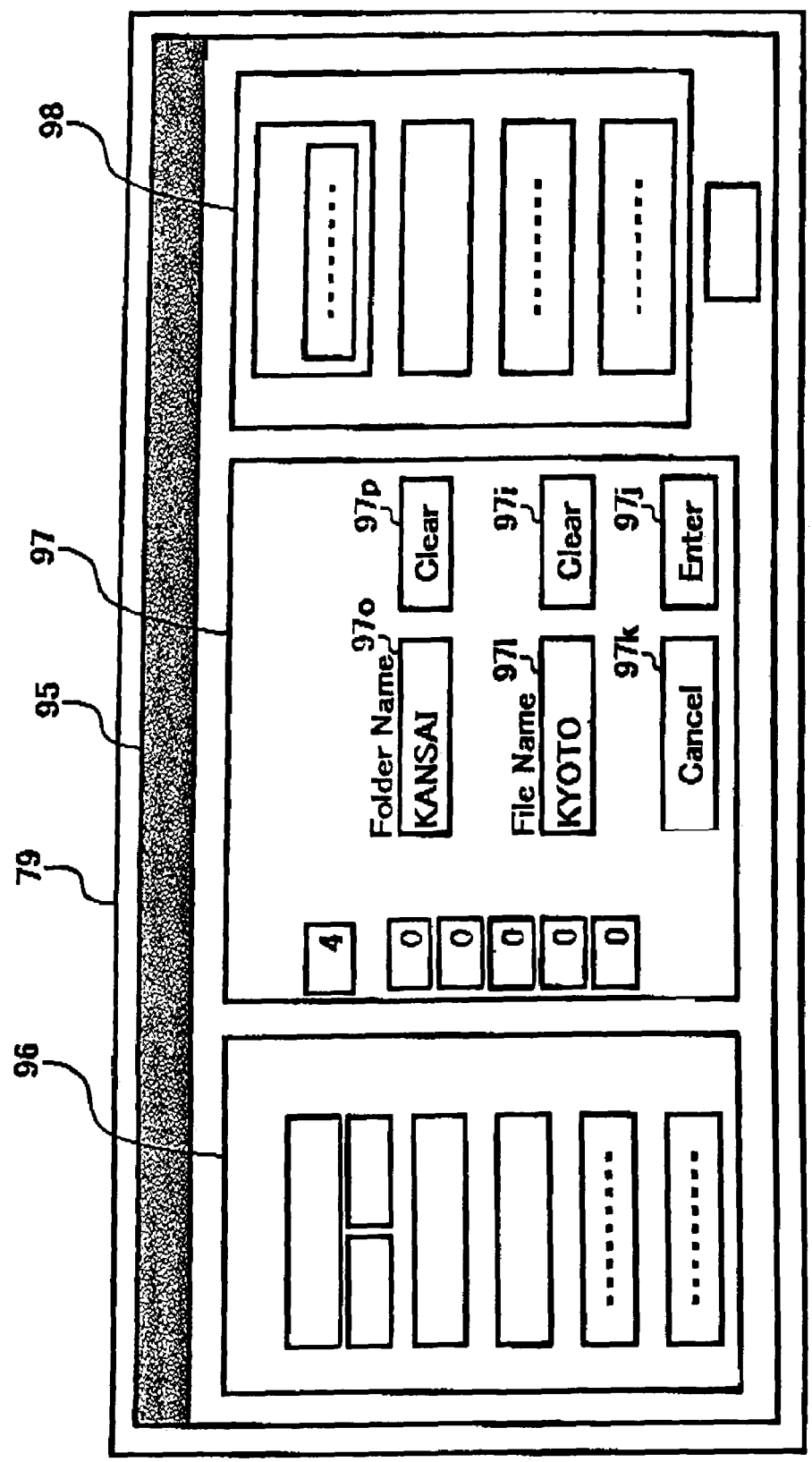
FIG. 15 is a partial view illustrating a display for inputting name preferences, displayed by the operational panel of FIG. 1, according to an embodiment of the present invention.
Figure 16:
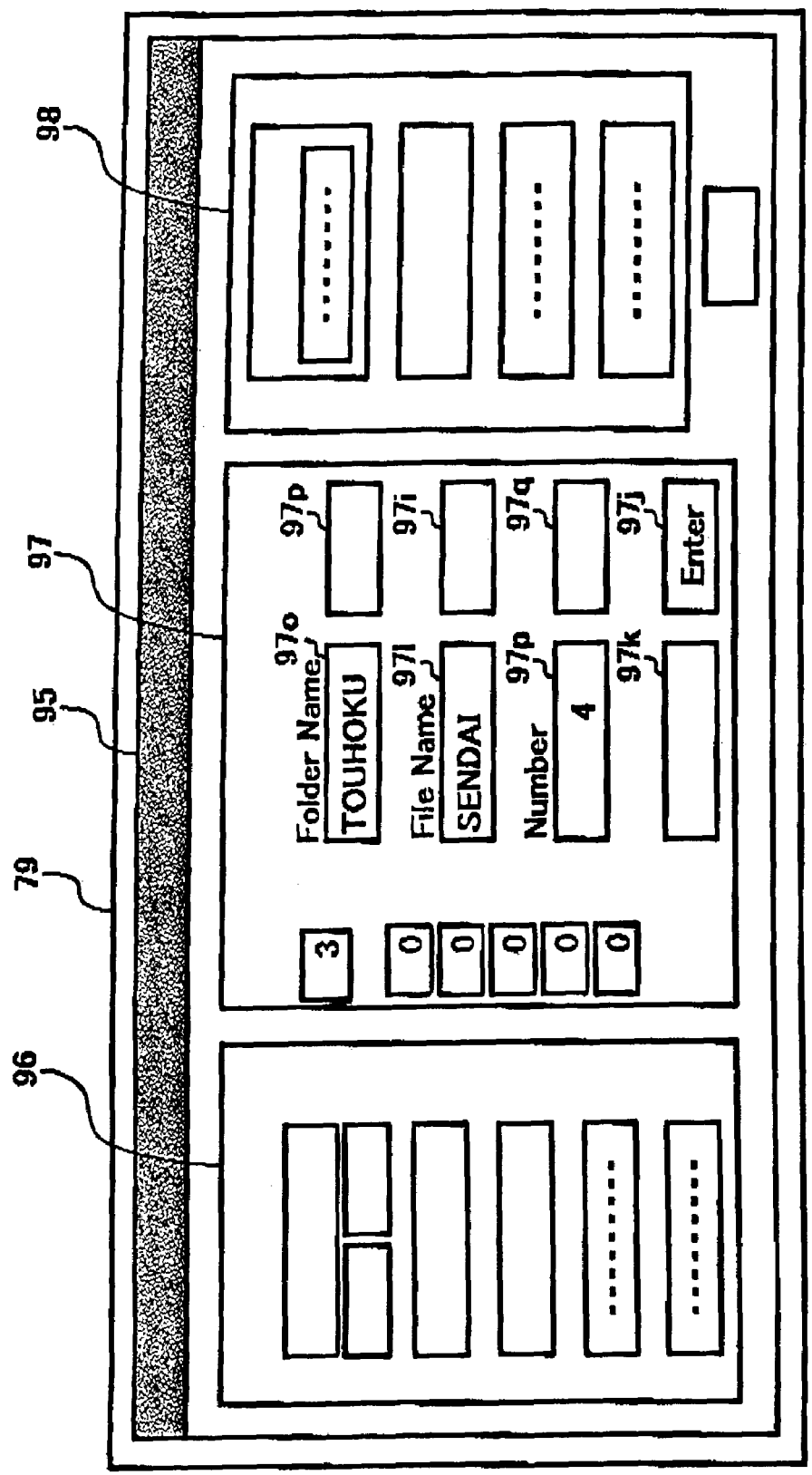
FIG. 16 is a partial view illustrating a display for inputting name preferences, displayed by the operational panel of FIG. 1, according to an embodiment of the present invention.

Step S7 causes the operational panel 220 to display another file display shown in any one of FIGS. 14 to 16, for example, to allow the user to input name preferences. FIG. 14 illustrates an exemplary case of setting a file name and an initial sequential number (hereinafter, referred to as the "first example"). FIG. 15 illustrates an exemplary case of setting a folder name and a file name (hereinafter, referred to as the "second example"). FIG. 16 illustrates an exemplary case of setting a folder name, a file name, and a folder number digit (hereinafter, referred to as the "third example").

In the first example shown in FIG. 14, the display panel 97 includes a file name key 97*l* for inputting a file name, an initial number key 97*m* for inputting an initial sequential number to be added after the file name, and a cancel key 97*k* for canceling previous input or a current operation, in addition to the keys displayed in the display panel 97 of FIG. 12.

For example, if the user prefers to assign the file name "OHSAKA" to the first to fourth files F1 to F4 shown in FIG. 13, the user inputs "OHSAKA" to the file name key 97*l*, using the keyboard of the operational panel 220. Further, if the user prefers to assign the sequential numbers starting from 001 to the first to fourth files F1 to F4, respectively, the user inputs the number "001" to the initial number key 97*m*, using the ten key panel 80*a* of the operational panel 220, or using the up or down key 97*g* or 97*h*. In this exemplary case, the first to fourth files F1 to F4 are stored in a predetermined folder, named "Image".

Accordingly, the first file F1, the second file F2, the third file F3, and the fourth file F4 are assigned with the names "OHSAKA 001", "OHSAKA 002", "OHSAKA 003", and "OHSAKA 004", respectively. Further, the first to fourth files F1 to F4 are stored in the folder named "Image".

In the second example shown in FIG. 15, the display panel 97 includes a folder name key 97*o* for inputting a folder name, the file name key 97*l*, and the cancel key 97*k*, in addition to the keys displayed in the display panel 97 of FIG. 12.

For example, if the user prefers to store the first to fourth files F1 to F4 of FIG. 13 in a folder named "KANSAI", the user inputs "KANSAI" to the folder name key 97*o*, using the keyboard of the operational panel 220. Further, if the user prefers to assign the file name "KYOTO" to the first to fourth files F1 to F4 shown in FIG. 13, the user inputs "KYOTO" to the file name key 97*l*, using the keyboard of the operational panel 220. In this exemplary case, the initial sequential number to be added after the file name is previously set as "100".

Accordingly, the first file F1, the second file F2, the third file F3, and the fourth file F4 are assigned with names "KYOTO 100", "KYOTO 101", "KYOTO 102", and "KYOTO 103", respectively. Further, the first to fourth files F1 to F4 are stored in the folder named "KANSAI".

In the third example shown in FIG. 16, the display panel 97 includes the folder name key 97*o*, the file name key 97*l*, a folder number key 97*p*, and the cancel key 97*k*. The folder number key 97*p* is provided for inputting a number of digits included in a sequential number, which may be added after the folder name. In this exemplary case, the sequential number is added to the folder name when a user inputs a folder name, which is already used by at least one folder stored in the image forming apparatus 1.

For example, if the user prefers to store the first to fourth files F1 to F4 of FIG. 13 in a folder named "TOUHOKU", the user inputs "TOUHOKU" to the folder name key 97*o*, using the keyboard of the operational panel 220. Further, if the user prefers to assign the file name "SENDAI" to the first to fourth files F1 to F4 shown in FIG. 13, the user inputs "SENDAI" to the file name key 97*l*, using the keyboard of the operational panel 220. Accordingly, the first file F1, the second file F2, the third file F3, and the fourth file F4 are assigned with the names "SENDAI 001", "SENDAI 002", "SENDAI 003", and "SENDAI 004", respectively.

Furthermore, if the user prefers to add a 4-digit sequential number after the folder name, the user inputs the number "4" to the folder number key 97*p*. If a folder having the folder name "TOUHOKU", "TOUHOKU 0001", and "TOUHOKU 0002" already exist, then the first to fourth files F4 are stored in a folder named "TOUHOKU 0003", for example.

The third example illustrates an exemplary case of avoiding the same name being assigned to more than two folders. Assigning the same name to more than two image files may also be avoided in a similar manner.

For example, if the second file F2 of FIG. 13 is supposed to be assigned with the name "SENDAI 002", and if the image file having the name "SENDAI 002" is already stored, the second file F2 is preferably assigned with the name "SENDAI 0021", for example. In this way, each image file or folder can be identified with a unique name.

After name preferences are set, the user selects the "Enter" key 97*j* to send information regarding the name preferences ("name information") to the system controller 31*a*. The system controller 31*a* stores the name information in the MEM, for example.

Step S8 causes the IMAC to generate image files according to the dividing information and the name information. The system controller 31*a* instructs the IMAC to generate image files according to the dividing and name information. The IMAC reads out the image data scanned in Step S5, and generates image files based on the image data according to the dividing and name information.

For example, in the exemplary case shown in FIG. 13, the IMAC generates the first file F1, the second file F2, the third file F3, and the fourth file F4, according to the dividing and name information, generated in the previous steps.

Step S9 causes the operational panel 220 to display directory structures of the generated files. For example, if the first to fourth files F1 to F4 of FIG. 13 are generated, the touch panel 79 of the operational panel 220 displays a folder storing these files, in the display panel 97, as illustrated in any one of FIGS. 17 to 19, for example.

Figure 17:
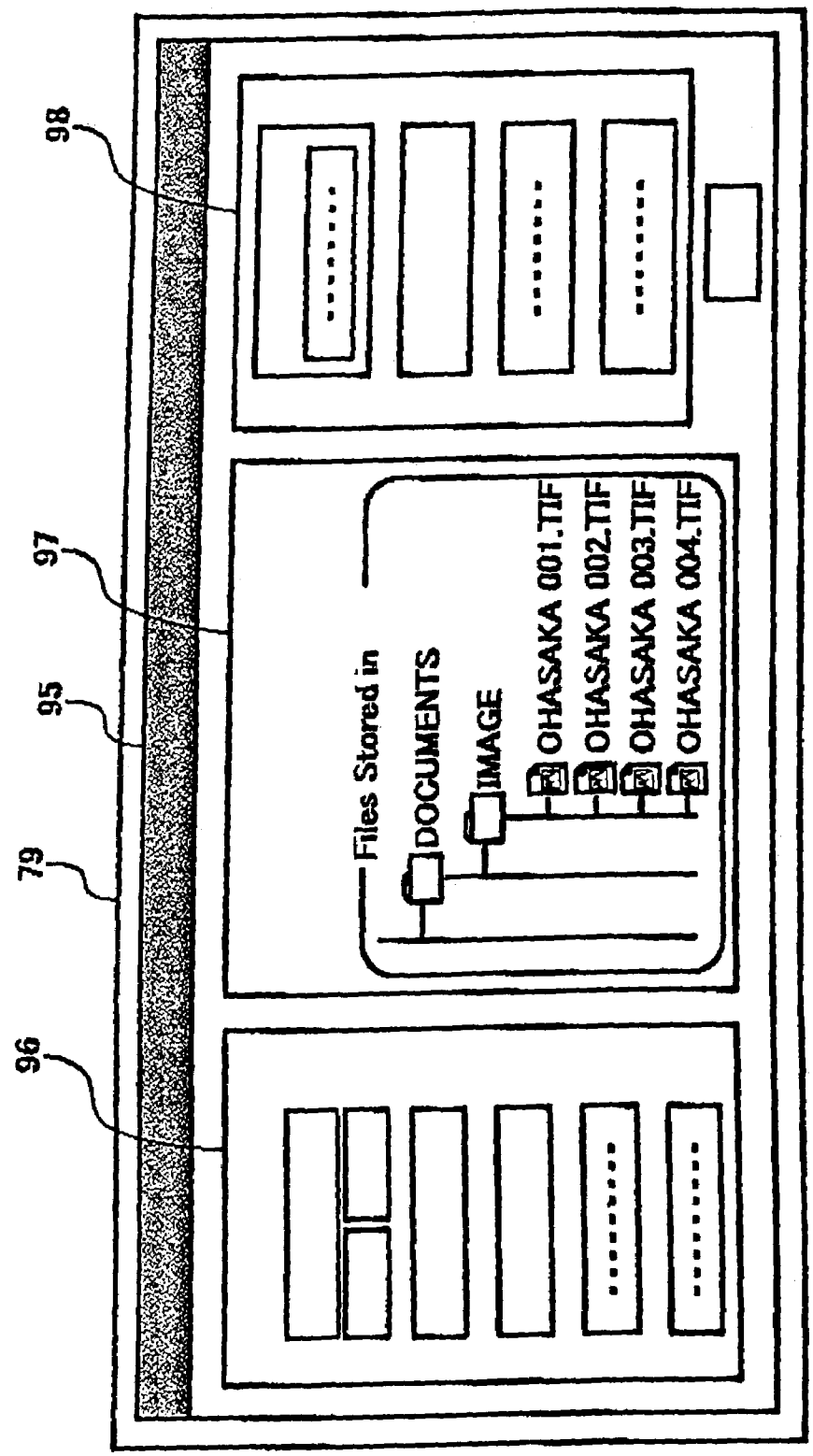
FIG. 17 is a partial view illustrating a display for displaying a directory structure, displayed by the operational panel of FIG. 1, according to an embodiment of the present invention.
Figure 18:
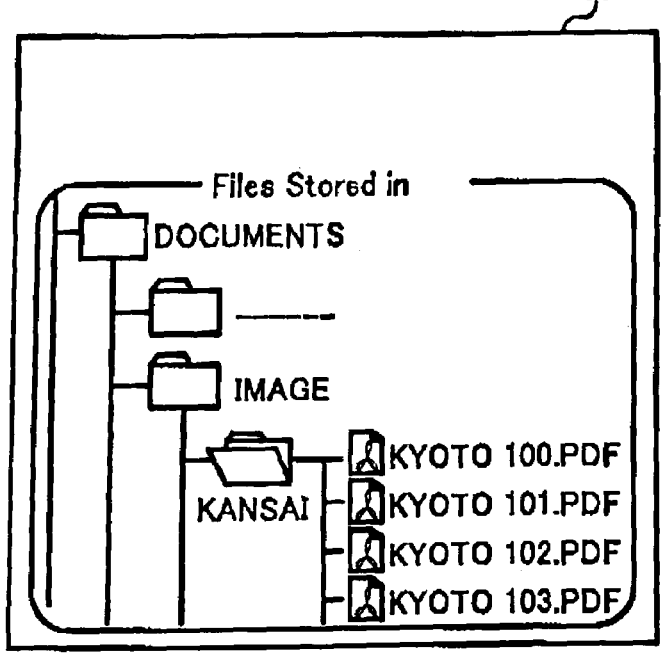
FIG. 18 is a partial view illustrating a display for displaying a directory structure, displayed by the operational panel of FIG. 1, according to an embodiment of the present invention.
Figure 19:
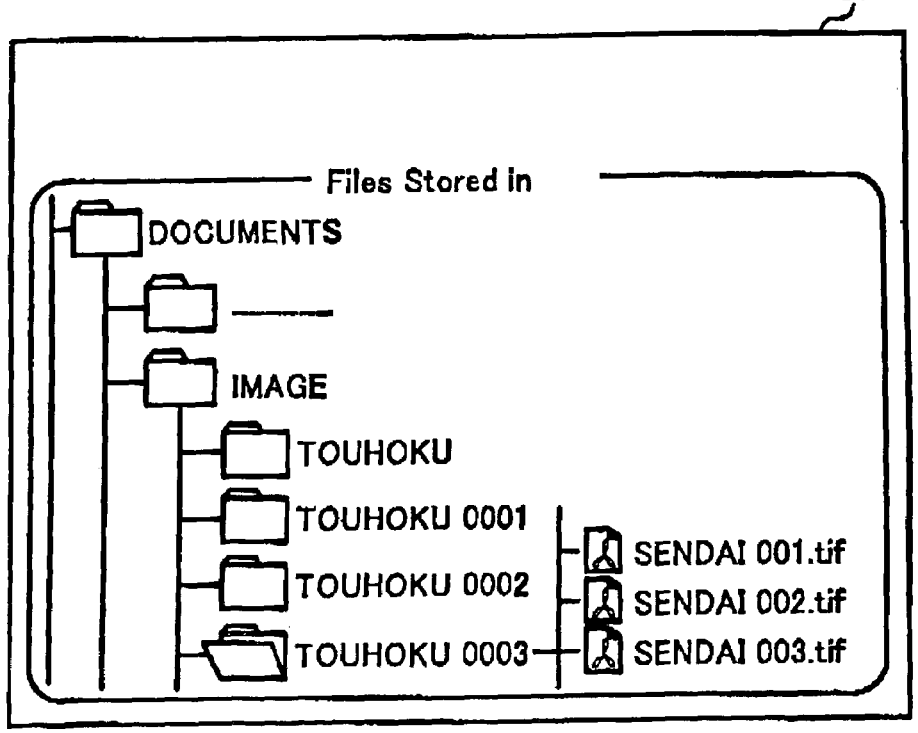
FIG. 19 is a partial view illustrating a display for displaying a directory structure, displayed by the operational panel of FIG. 1, according to an embodiment of the present invention.

FIG. 17 illustrates an exemplary case, corresponding to the first example shown in FIG. 14, of displaying that the first to fourth files F1 to F4 are stored in the folder named "Image". FIG. 18 illustrates an exemplary case, corresponding to the second example shown in FIG. 15, of displaying that the first to fourth files F1 to F4 are stored in the folder named "KANSAI". FIG. 19 illustrates an exemplary case, corresponding to the third example shown in FIG. 16, of displaying that the first to fourth files F1 to F4 are stored in the folder named "TOUHOKU".

After displaying the directory structures, the process ends to cause the operational panel 220 to display the initial scanning display of FIG. 11, for example.

Step S11 determines whether the send operation is selected. A user can select the send operation by touching the "Enter" key 94 after touching the "Send" key 92. If the send operation is selected, the process moves to Step S12 to perform Steps S12, S4 to S8, S13, and S14. Otherwise, the process moves to Step S17.

Step S12 causes the operational panel 220 to display an initial send display, which is substantially similar to the initial file display shown in FIG. 12, except that the status bar 95 displays "Send", indicating that the send operation is selected.

After performing Steps S4 to S8, the process moves to Step S13 to transfer the image files to the delivery server DSR.

Step S14 receives information regarding directory structures of the image files sent to the delivery server DSR, from the delivery server DSR. Step S14 further displays such information on the touch panel 79 of the operational panel 220, as shown in any one of FIGS. 17 to 19, for example.

At this step, the user may input destination information to instruct the delivery server DSR to send at least one of the image files to a destination specified by the destination information.

After displaying the directory structures, the process ends to cause the operational panel 220 to display the initial scanning display of FIG. 11, for example.

Step S17 determines whether the email operation is selected. A user can select the email operation by touching the "Enter" key 94 after touching the "Email" key 93. If the email operation is selected, the process moves to Step S18, to perform Steps S18, S4 to S8, and S19 to S21. Otherwise, the process moves to Step S22.

Step S18 causes the operational panel 220 to display an initial email display, which is substantially similar to the initial file display shown in FIG. 12, except that the status bar 95 displays "Email", indicating that the email operation is selected.

After performing Steps S4 to S8, the process moves to Step S19 to allow the user to input destination information, such as an email address. If the user selects a "Select Destination" key shown in FIG. 12, for example, the display panel 97 displays a display for inputting or selecting an email destination. Further, if the user selects a "Select File" key shown in FIG. 12, for example, the display panel 97 displays a display for selecting an image file to be sent, or a display for inputting a preferred file format, such as JPEG, TIFF, or PDF, for example.

Step S20 stores the generated image files in the image area of the HDD, for example. Step S20 further transfers the image files to the destination address specified by the user in Step S19.

Step S21 receives information regarding directory structures of the images files sent to the email destination, from the email destination. Step S21 further displays such information on the touch panel 79 of the operational panel 220, as shown in any one of FIGS. 17 to 19, for example.

After displaying the directory structures, the process ends to cause the operational panel 220 to display the initial scanning display of FIG. 11, for example.

Step S22 determines whether the operational panel 220 receives other input from the user. If yes, the process moves to Step S23 to display information according to the input of the user. Otherwise, the process ends, without performing any scanning operations.

For example, if the user selects the "Start" key 80c, without selecting from the scanning selection part 79c, the operational panel 220 displays at least one of the initial file display, the initial store display, and the initial email display, depending on the default settings previously input by the user.

Figure 20:
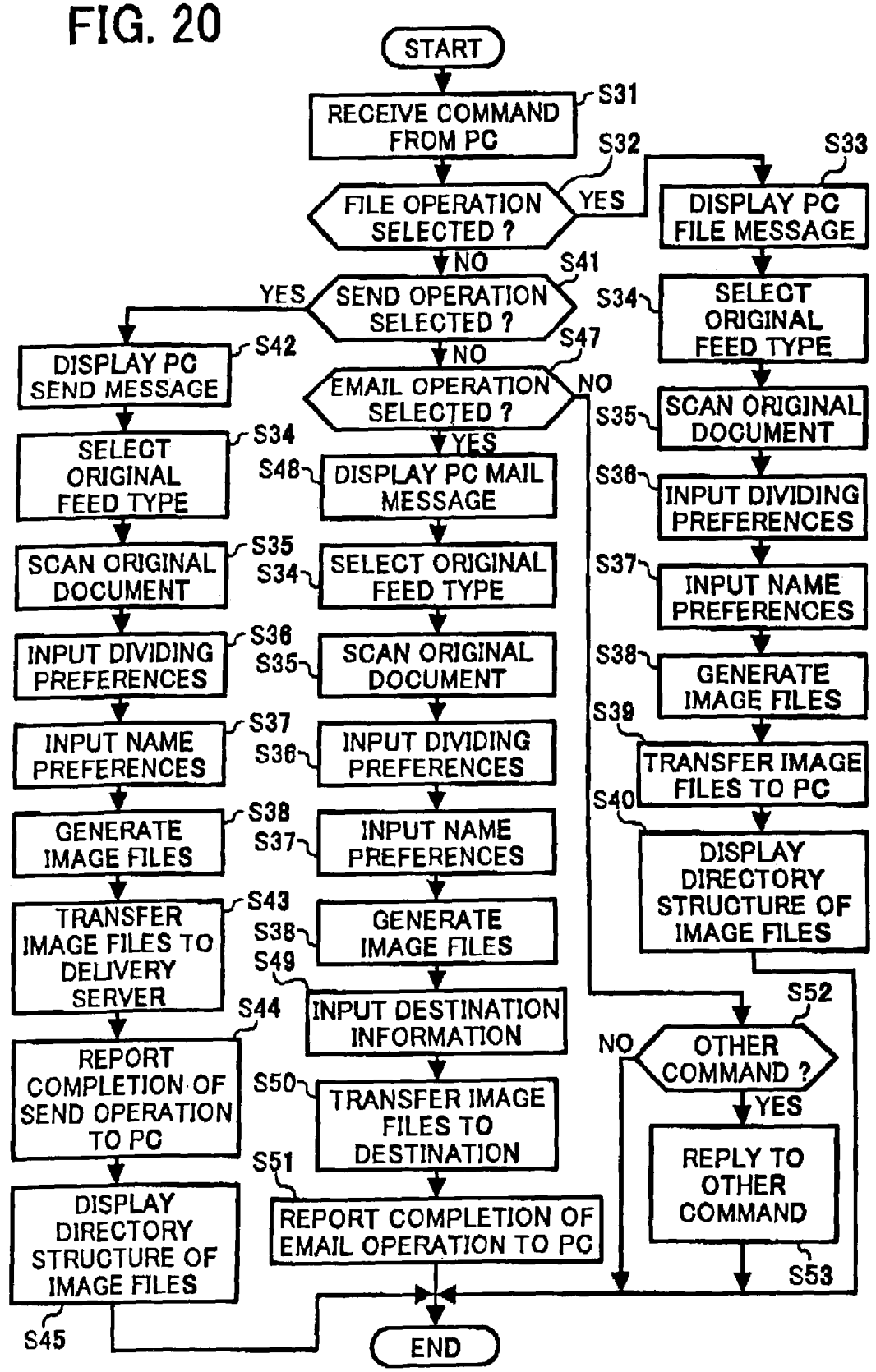
FIG. 20 is a flowchart illustrating exemplary scanning operations, performed by the image forming apparatus of FIG. 1, according to an embodiment of the present invention.

Referring now to FIG. 20, exemplary scanning operations, performed by the image forming apparatus 1, are explained, according to another embodiment of the present invention. The steps shown in FIG. 20 are performed by the system controller 31a, when a user selects the scan function, by using an input device provided with the PC, for example. The system controller 31a loads the image file generating program and one or more other programs stored in the HDD onto the involatile memory 35 to perform the steps illustrated in FIG. 10.

Step S31 receives a command requesting the scan operation, from the PC.

Step S32 determines whether the file operation is selected according to the command received from the PC. A user can select the file operation by using the input device, such as a mouse or a keyboard. If the file operation is selected, the process moves to Step S33 to perform Steps S33 to S40. Otherwise, the process moves to Step S41.

Step S33 causes the operational panel 220 to display a message, indicating that the file operation is performed through the PC, on the status display part 79b of the operational panel 220.

Step S34 allows the user to select an original feed type through the PC. In this exemplary case, the PC displays information corresponding to at least one of the keys displayed on the touch panel of FIG. 12. The PC may further display a list of image files, stored in the PC, to be sent to the image forming apparatus 1.

Step S35 scans an original document provided by the user through the image forming apparatus 1, in a similar manner as described in Step S5 of FIG. 10. Alternatively, Step S35 may receive an image file of image data sent from the PC, according to the information obtained in Step S34. The image data is then stored in the image memory area of the MEM or HDD.

Step S36 allows the user to input dividing preferences, in a substantially similar manner as described in Step S6 of FIG. 10. In this exemplary case, however, the PC displays information corresponding to at least one of the keys displayed on the touch panel 79 of FIG. 12.

Step S37 allows the user to input name preferences, in a substantially similar manner as described referring to Step S7 of FIG. 10. In this exemplary case, however, the PC displays information corresponding to at least one of the keys displayed on the display panel 97 shown in FIGS. 14 to 16.

Step S38 generates or edits image files, in a substantially similar manner as described in Step S8 of FIG. 10.

Step S39 transfers the image files to the PC.

In Step S40, the PC displays directory structures of the image files on a display connected to the PC, as illustrated in any one of FIGS. 17 to 19, for example. In this exemplary case, if the user selects one of the image file icons displayed on the display by clicking it with the mouse, a thumbnail image and property information corresponding to the selected file icon is displayed. When the user further selects the thumbnail image, the image file corresponding to the selected thumbnail image is opened and displayed.

FIG. 41 determines whether the send operation is selected according to the command received from the PC. A user can select the send operation by using the input device. If the send operation is selected, the process moves to Step S42 to perform Steps S34 to S38, and S43 to S45. Otherwise, the process moves to Step S47.

Step S42 causes the operational panel 220 to display a message, indicating that the send operation is performed through the PC, on the status display part 79b of the operational panel 220.

After performing Steps S34 to S38, the process moves to Step S43 to transfer the image files to the delivery server DSR.

Step S44 reports the PC that the send operation is completed.

In Step S45, the PC receives information regarding directory structures of the image files sent to the delivery server DSR, from the delivery server DSR. The PC then displays the received information on the display, as illustrated in any one of FIGS. 17 to 19, for example. At this step, the user may instruct the delivery server DSR to send at least one of the files to a destination, by specifying the files and the destination, through the PC.

Step S47 determines whether the email operation is selected according to the command received from the PC. A user can select the email operation by using the input device. If the email operation is selected, the process moves to Step S48 to perform Steps S48, S34 to S38, and S49 to S51. Otherwise, the process moves to Step S52.

Step S48 causes the operational panel 220 to display a message, indicating that the email operation is performed through the PC, on the status display part 79b of the operational panel 220.

After performing Steps S34 to S38, the process moves to Step S49 to input email destination, in a substantially similar manner as described in Step S19 of FIG. 10.

Step S50 transfers the image files to the email destination, specified in the previous step.

Step S51 reports the PC that the email operation is completed, and the process ends.

Step S52 determines whether the command other than the scanning operation is input from the user. If yes, the process moves to Step S53 to operate according to the command. Otherwise, the process ends, without performing scanning operations.

Figure 21:
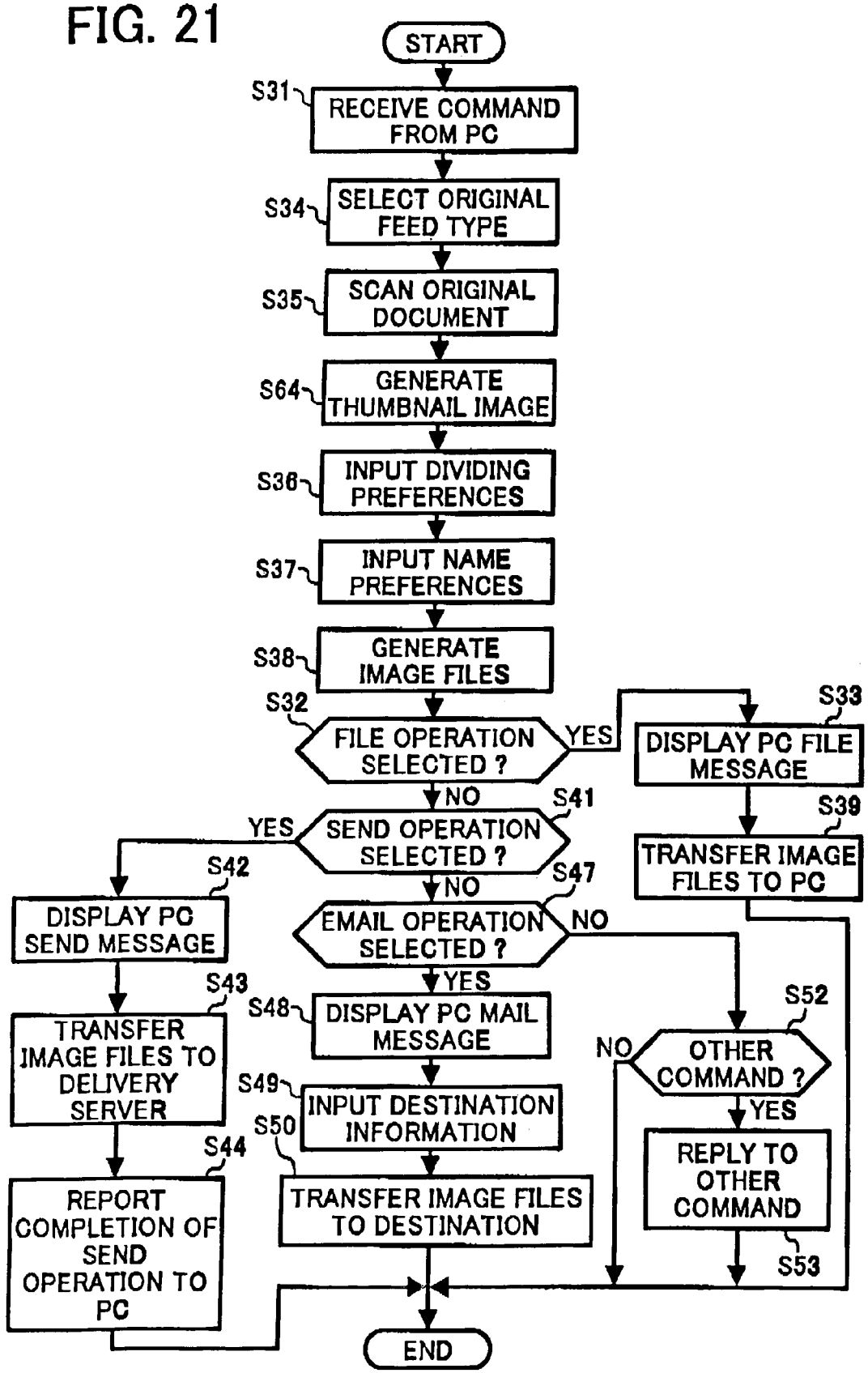
FIG. 21 is a flowchart illustrating exemplary scanning operations, performed by the image forming apparatus of FIG. 1, according to an embodiment of the present invention.

Referring now to FIG. 21, exemplary scanning operations, performed by the image forming apparatus 1, are explained, according to another embodiment of the present invention. The steps shown in FIG. 21 are substantially similar to the steps shown in FIG. 20, except for the addition of Step S64. Further, the order of performing the respective steps shown in FIG. 21 are different from the order shown in FIG. 20.

Step S64 generates a thumbnail image for each page of the image data scanned in Step S35, or for each image file received in Step S35. Step S64 further sends the generated thumbnail image to the PC. In this way, the PC can check the image data or image files on the display.

In this exemplary case, any one of Steps 33, 42, and 48 may not be performed.

Figure 22:
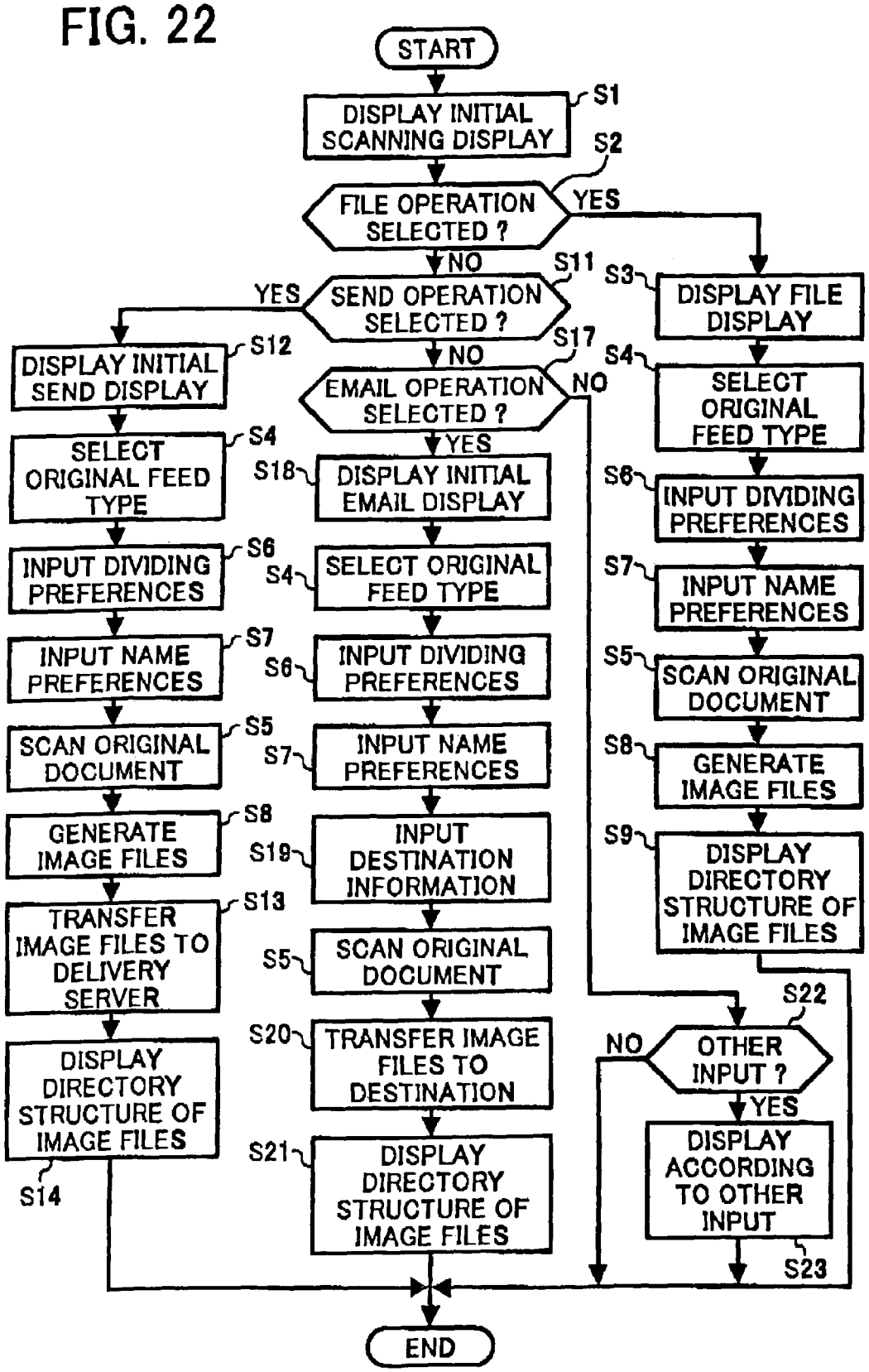
FIG. 22 is a flowchart illustrating exemplary scanning operations, performed by the image forming apparatus of FIG. 1, according to an embodiment of the present invention.
Figure 23:
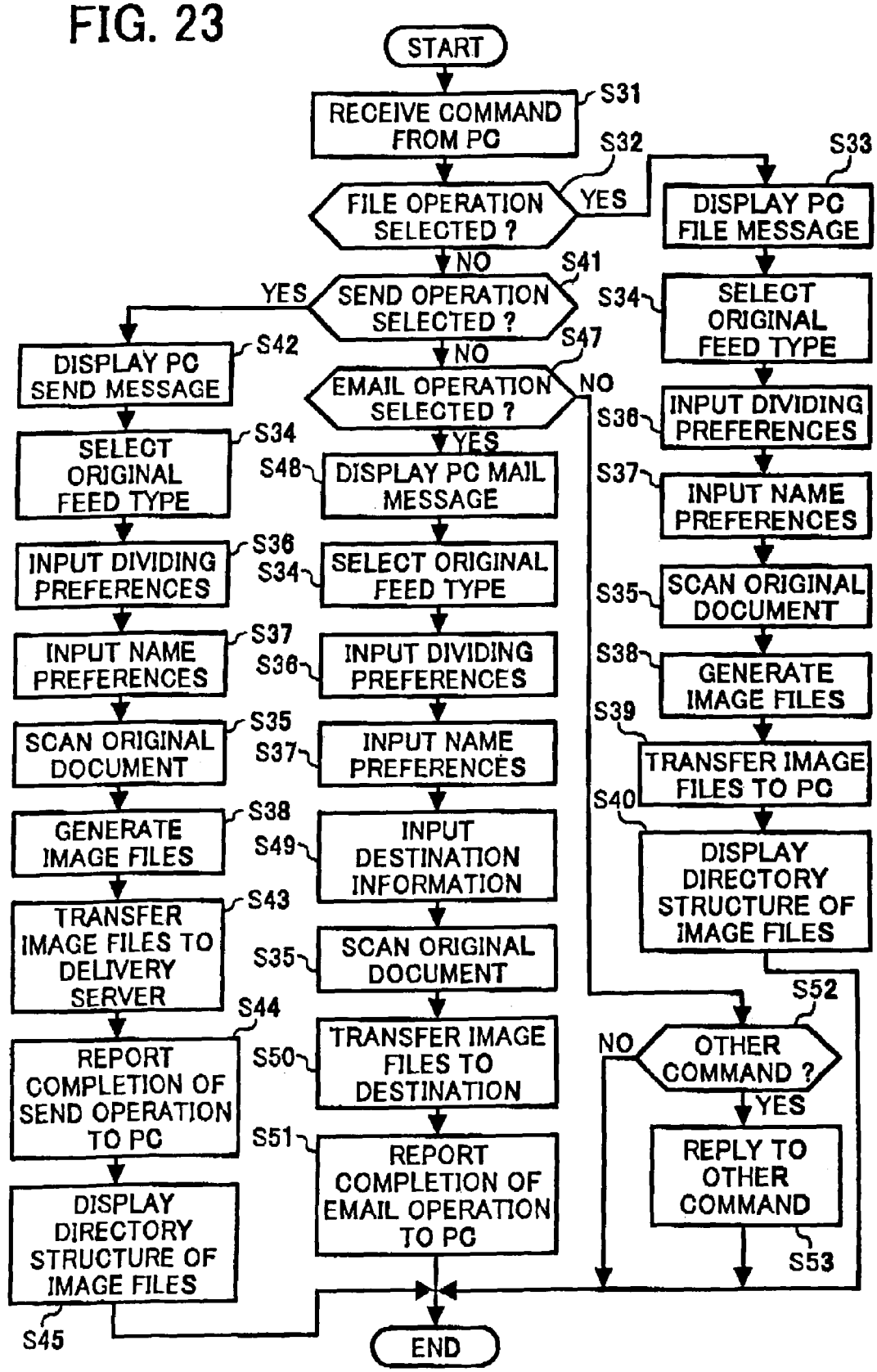
FIG. 23 is a flowchart illustrating exemplary scanning operations, performed by the image forming apparatus of FIG. 1, according to an embodiment of the present invention.

The steps shown in any one of FIGS. 10, 20, and 21 may be performed in different orders, as illustrated in any one of FIGS. 22 and 23, for example.

The steps shown in FIG. 22 are substantially similar to the steps shown in FIG. 10, except that the steps are performed in a different order. The steps shown in FIG. 23 are substantially similar to the steps shown in FIG. 20, except that the steps are performed in a different order.

In any one of FIGS. 22 and 23, the operations for setting various preferences or destinations are performed before the scanning operation. In the send operation, destination information may be provided before the scanning operation.

Furthermore, the operation shown in any one of FIGS. 10, 20, and 21 to 23 may be performed for each of image files to be generated, and repeated until all of the image files are stored or sent, instead of performing the operation for all of the image files at once. In this way, the image memory area may be used more efficiently.

According to the example illustrated in FIGS. 22 and 23, a number of pages for each file, in the equal division mode or the file-specific division mode, a file name, or an initial sequential number, are initially set. Further, a destination is set and connection with the destination is established. An original document is then scanned by the scanner 210. When a number of originals for one file are completed, scanning is stopped, and image data of one file is stored in an image memory area of the HDD. After assigning the specified folder name and the initial sequential number to the image data, the image data is sent or stored in a specified directory. When a file to be generated exists, scanning is started to generate a next file, which may be sent or stored in a specified directory, in a similar manner as described above. This operation is repeated until the total number of pages to be included in the set of files is scanned, which is specified according to the equal division mode or the file-specific division mode. When the entire original set has been scanned by the ADF 230 before completing scanning the total number of pages, a file may nevertheless be generated at this time. When one or more pages of the original set remains after completing scanning of the total number of set pages, the ADF 230 nevertheless continues to scan the remaining pages and generates a file which stores each additional page and has a sequential number.

Numerous additional modifications and variations are possible in light of the above teachings. It is therefore to be understood that within the scope of the appended claims, the disclosure of this patent specification may be practiced otherwise than as specifically described herein.

For example, the image forming apparatus 1 of FIG. 1, or the devices or components of the image forming apparatus 1 shown in any one of FIGS. 2 to 9, are given for the descriptive purposes. The present invention may be thus applied to any image forming apparatus, capable of generating a plurality of image files according to the disclosure of this patent specification and the appended claims.

Accordingly, specific functions or structures provided by the operational panel, or specific operations of the image forming apparatus may differ depending on the devices, components, functions, or structures of the image forming apparatus in use.

What is claimed is:

1. An image file generating apparatus, comprising:
   a grouping preferences input unit configured to input grouping preferences information, including group number information specifying a total number of pages of an original document and a number of pages of the original document to be included in each of a predetermined number of second image files;
   a name preferences input unit configured to receive name preferences information from a user, including
      file name prefix information specifying a received user file name prefix to be assigned to each of the second image files, and
      file initial number information specifying an initial sequential number received from the user;
   an original document reader including a scanner having an automatic feeding function and configured to read each page of the original document and to store the read pages as first image files based on the total number of pages of the original document specified in the grouping preferences information; and
   an image file generator configured to generate the second image files from the first image files for each page read according to the grouping preferences and the received name preferences, and generate a file name of each second image file that includes the received user file name prefix and a sequential number based on the initial sequential number received from the user,
   wherein when the total number of pages of the original document specified in the grouping preferences information is more than a total number of pages actually read by the original document reader, the image file generator is further configured to generate at least one of the second image files with less than the number of pages specified in the grouping preferences information.

2. The image file generating apparatus of claim 1, wherein when a total number of pages specified in the grouping preferences information is less than a total number of pages actually read by the original document reader, the image file generator is further configured to generate an additional second image file including a remaining number of pages which were not specified in the grouping preferences information.

3. An image file generating method, comprising:

inputting grouping preferences information, including group number information specifying a total number of pages of an original document and a number of pages of the original document to be included in each of a predetermined number of second image files;

receiving name preferences information from a user, the name preferences information including file name prefix information specifying a received user file name prefix to be assigned to each of the second image files and file initial number information specifying an initial sequential number received from the user;

reading, utilizing a scanner having an automatic feeding function, each page of the original document;

storing the read pages as first image files based on the total number of pages of the original document specified in the grouping preferences information;

generating the second image files from the first image files for each page read according to the grouping preferences and the received name preferences;

generating a file name of each second image file that includes the received user file name prefix and a sequential number based on the initial sequential number received from the user; and when the total number of pages of the original document specified in the grouping preferences information is more than a total number of pages actually read by the scanner, generating at least one of the second image files with less than the number of pages specified in the grouping preferences information.

4. The image file generating method of claim 3, further comprising:

when a total number of pages specified in the grouping preferences information is less than a total number of pages actually read by the scanner, generating an additional second image file including a remaining number of pages which were not specified in the grouping preferences information.

* * * * *